United States Patent
Walker et al.

(10) Patent No.: US 11,734,203 B2
(45) Date of Patent: Aug. 22, 2023

(54) RESPONSE-BASED INTERCONNECT CONTROL

(71) Applicant: Micron Technology, Inc., Boise, ID (US)

(72) Inventors: Robert Walker, Raleigh, NC (US); Nikesh Agarwal, Bangalore (IN)

(73) Assignee: Micron Technologies, Inc., Boise, ID (US)

( * ) Notice: Subject to any disclaimer, the term of this patent is extended or adjusted under 35 U.S.C. 154(b) by 43 days.

(21) Appl. No.: 17/556,908

(22) Filed: Dec. 20, 2021

(65) Prior Publication Data
US 2023/0195656 A1    Jun. 22, 2023

(51) Int. Cl.
G06F 13/16    (2006.01)
H04L 47/10    (2022.01)
G06F 9/30    (2018.01)

(52) U.S. Cl.
CPC ...... *G06F 13/1621* (2013.01); *G06F 9/30043* (2013.01); *G06F 9/30101* (2013.01); *G06F 13/1642* (2013.01); *G06F 13/1668* (2013.01); *H04L 47/39* (2013.01)

(58) Field of Classification Search
CPC ............ G06F 13/1621; G06F 9/30043; G06F 9/30101; G06F 13/1642; G06F 13/1668; H04L 47/17; H04L 47/39
See application file for complete search history.

(56) References Cited

U.S. PATENT DOCUMENTS

| | | | | |
|---|---|---|---|---|
| 10,740,243 | B1* | 8/2020 | Benisty | G06F 3/061 |
| 2008/0062873 | A1* | 3/2008 | Semrad | H04L 12/66 370/232 |
| 2019/0116121 | A1* | 4/2019 | Friedman | H04L 47/11 |
| 2020/0084150 | A1* | 3/2020 | Burstein | H04L 47/805 |

* cited by examiner

*Primary Examiner* — Charles Rones
*Assistant Examiner* — Hewy H Li
(74) *Attorney, Agent, or Firm* — Colby Nipper PLLC

(57) ABSTRACT

Described apparatuses and methods enable a receiver of requests, such as a memory device, to control the arrival of future requests using a credit-based communication protocol. A transmitter of requests can be authorized to transmit a request across an interconnect responsive to possession of a credit. If the transmitter exhausts its credits, the transmitter waits until a credit is returned before transmitting another request. The receiver can manage credit returns based on how many responses are present in a response queue. The receiver can change a rate at which the credit returns are transmitted by changing a size of an interval of responses that are being transmitted, with one credit being returned per interval. This can slow the rate of credit returns while the response queue is relatively more filled. The rate adjustment can decrease latency by reducing an amount of requests or responses that are pooling in backend components.

45 Claims, 11 Drawing Sheets

RESPONSE-BASED INTERCONNECT CONTROL

BACKGROUND

Computers, smartphones, and other electronic devices operate using processors and memories. A processor executes code based on data to run applications and provide features to a user. The processor obtains the code and the data from a memory that can store information. As a result, like a processor's speed or number of cores, a memory's type or other characteristics can impact the performance of an electronic device. Different types of memory may have different characteristics. Memory types include volatile memory and nonvolatile memory, such as random access memory (RAM) and flash memory, respectively. RAM can include static RAM (SRAM) and dynamic RAM (DRAM), such as Compute Express Link™ (CXL) attached memory. Flash memory can be used to build, for instance, a solid-state drive (SSD).

Demands on the different types of memory continue to evolve and grow. For example, as processors are engineered to execute code faster, such processors can benefit from accessing memories more quickly. Applications may also operate on ever-larger data sets that occupy ever-larger memories. Due to battery-powered electronic devices and power-hungry data centers, energy-usage constraints are becoming more prevalent for memory systems. Further, manufacturers may seek physically smaller memories as the form factors of portable electronic devices continue to shrink. Accommodating these various demands is complicated by the diverse strengths and capabilities of different types of memories.

BRIEF DESCRIPTION OF THE DRAWINGS

Apparatuses of and techniques for response-based interconnect control are described with reference to the following drawings. The same numbers are used throughout the drawings to reference like features and components.

DETAILED DESCRIPTION

Overview

Figure 1:
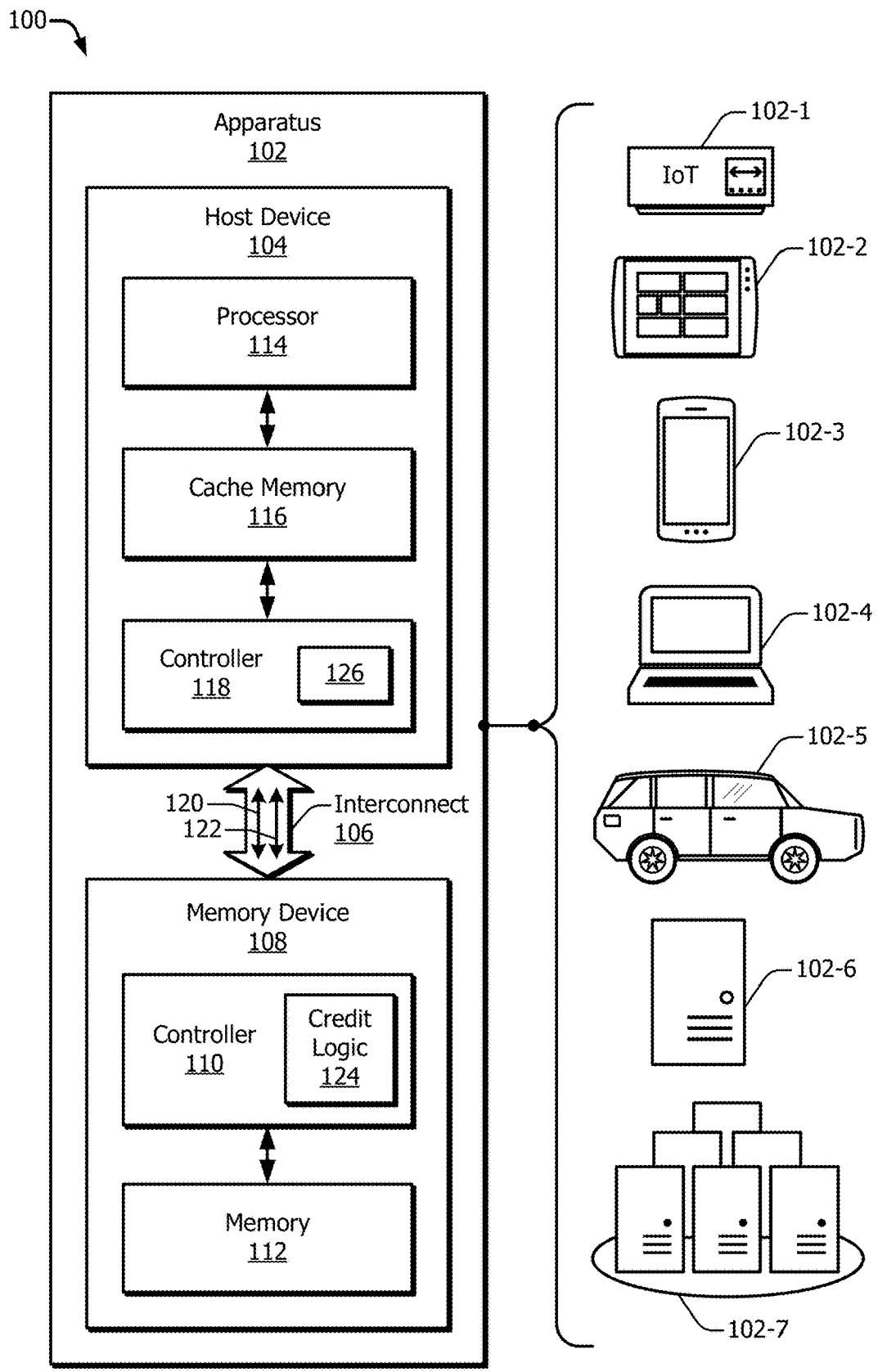
FIG. 1 illustrates example apparatuses that can implement response-based interconnect control.

Processors and memory work in tandem to provide features to users of computers and other electronic devices. Generally, an electronic device can provide enhanced features, such as high-resolution graphics or artificial intelligence, as a processor and memory operate more quickly together in a complementary manner. Some applications, like those for AI analysis and virtual-reality graphics, can also demand increasing amounts of memory. Such applications use increasing amounts of memory to more accurately model and mimic human thinking and the physical world.

Processors and memories can be secured to a printed-circuit board (PCB), such as a rigid or flexible motherboard. The PCB can include sockets for accepting at least one processor and one or more memories. Wiring infrastructure that enables communication between two or more components can also be disposed on at least one layer of the PCB. This PCB, however, provides a finite area for the sockets and the wiring infrastructure. Some PCBs include multiple sockets that are each shaped as a linear slot and designed to accept a double-inline memory module (DIMM). These sockets can be fully occupied by DIMMs while a processor is still able to utilize more memory. In such situations, the system is capable of performing better if additional memory were available to the processor.

Printed circuit boards may also include at least one peripheral component interconnect (PCI) express (PCI Express®) (PCIe or PCI-E) slot. A PCIe slot is designed to provide a common interface for various types of components that may be coupled to a PCB. Compared to some older standards, PCIe can provider higher rates of data transfer or a smaller footprint on the PCB, including both greater speed and smaller size. Accordingly, certain PCBs enable a processor to access a memory device that is connected to the PCB via a PCIe slot.

In some cases, accessing a memory solely using a PCIe protocol may not offer as much functionality, flexibility, or reliability as is desired. In such cases, another protocol may be layered on top of the PCIe protocol. An example of another, higher-level protocol is the Compute Express Link™ (CXL) protocol. The CXL protocol can be implemented over a physical layer that is governed by the PCIe protocol. The CXL protocol can provide a memory-coherent interface that offers high-bandwidth or low-latency data transfers, including data transfers having both higher bandwidth and lower latency.

Various electronic devices, such as a mobile phone having a processor that is part of a system-on-chip (SoC) or a cloud-computing server having dozens of discrete processing units, may employ memory that is coupled to a processor via a CXL-based interconnect. For clarity, consider an apparatus with a host device that is coupled to a memory device via a CXL-based interconnect. The host device can include a processor and a controller (e.g., a host-side controller) that is coupled to the interconnect. The memory device can include another controller (e.g., a memory-side controller) that is coupled to the interconnect and one or more memory arrays to store information in SRAM, DRAM, flash memory, and so forth.

During operation, the host-side controller issues memory requests to the memory-side controller over the interconnect. The memory request may be or may include a read request or a write request. The memory-side controller receives the memory request via the interconnect and directly or indirectly uses the memory arrays to fulfill the memory request with a memory response. Thus, the memory-side controller sends the memory response to the host-side controller over the interconnect. To fulfill a read request, the memory-side controller returns the requested data with the memory response. As part of fulfilling a write request, the memory-side controller can provide notice that the write operation was successfully completed by transmitting an acknowledgement as the memory response (e.g., using a message such as a subordinate-to-master no-data response completion (S2M NDR Cmp) message).

To increase bandwidth and reduce latency, the memory-side controller can include at least one request queue that may accumulate multiple memory requests (e.g., multiple read requests or multiple write requests) received from the host-side controller. In other words, the host-side controller can send a "subsequent" memory request before receiving a memory response corresponding to a "previous" memory request. This can ensure that the memory device is not waiting idly for another memory request that the host-side controller has already prepared. This technique can also better utilize the interconnect by transmitting the subsequent memory request before the memory response for the previous memory request is ready.

The request queue at the memory-side controller may, however, have space for a finite quantity of entries. If the host-side controller overflows the request queue at the memory-side controller, memory accessing can be slowed, and the overflow may even cause data loss. In other words, without a mechanism to control the flow of memory access requests from the host-side controller to the memory-side controller, memory bandwidth or latency can be degraded. Further, an overwhelmed request queue may even cause errors to occur.

The memory-side controller can also include a response queue to store multiple memory responses that have been received from a backend memory component, such as a memory array. The memory-side controller extracts a memory response from the response queue and transmits the memory response to the host-side controller to respond to a corresponding memory request and thereby complete a memory operation. If the memory array is "too fast" or the interconnect is "too slow," the response queue can overflow or become too full to safely and expeditiously accept new memory responses. Like an oversubscribed forward path of a memory device, a backlog on the return path can also adversely impact memory bandwidth or latency, especially if the host-side controller continues to send new memory requests.

One approach to modulating (e.g., moderating) the flow of memory requests involves using credits. The host-side controller can be granted a particular quantity of credits. A maximum credit quantity may be based, for instance, on a size of the request queue of the memory-side controller. If the host-side controller currently has, or "possesses," at least one credit, then the host-side controller can issue a memory request to the memory-side controller over the interconnect. On the other hand, if the host-side controller has depleted the granted supply of credits, the host-side controller waits until at least one credit has been replenished before issuing another memory request.

The memory-side controller can be responsible for replenishing credits. The memory-side controller can indicate to the host-side controller that one or more credits have been replenished, or "returned," using a communication across the interconnect. For example, a memory response that includes read data or a write acknowledgement can also include a credit return indication. In some cases, the memory-side controller returns a credit responsive to a memory request being removed from the request queue at the memory-side controller. This approach to credit-based control of an interconnect can prevent the request queue at the memory-side controller from overflowing and causing an error condition.

This approach may not, however, prevent memory bandwidth from being reduced or latency from increasing due to an oversupply of the total memory requests or memory responses present in the memory device. This is because the memory device includes, in addition to a response queue at the memory-side controller as described above, one or more "downstream" or "backend" memory components that are coupled to the memory-side controller. For example, the memory device includes one or more memory arrays and may include other components to facilitate memory request processing. Other components of the memory device may include at least one "internal" interconnect and one or more memory controllers, which are coupled to the memory arrays to control access thereto. Any of these memory components may include at least one respective queue, such as an additional memory request queue on the forward path or an additional response queue on the return path. For instance, each memory controller of two memory controllers may include a respective memory request queue of two memory request queues.

Responsive to the memory-side controller removing a memory request from its request queue, the memory-side controller forwards the memory request to a downstream or backend component, such as one of the memory controllers. The receiving memory controller may be accumulating memory requests in its respective request queue. This accumulation may occur, for instance, due to a relatively slower memory array that is unable to process requests at the rate at which the requests are being received from the memory-side controller. Thus, the memory-side controller may return a credit, which authorizes another memory request, to the host-side controller even though un-serviced memory requests are "piling up" within the memory device along the forward path. Further, memory responses may also be accumulating within the memory device along the return path, such as in a response queue of a memory controller, once a memory array has serviced a memory request.

Thus, request queues in various parts of the memory device may become saturated with memory requests, and response queues in various parts of the memory device may become saturated with memory responses. Allowing such queues of the memory controllers or of other backend components or the response queue of the memory-side controller to become saturated can lower the bandwidth throughput of the memory system. Moreover, saturating the forward path or the return path can also increase a length of the latency period between when the memory device accepts a memory request from the host device and when the memory device provides the corresponding memory response. Consequently, returning a credit to the host-side controller each time a memory request is removed from the request queue at the memory-side controller may adversely impact memory system performance.

With respect to memory response queues, a response queue can be present at the memory-side controller or any of the backend components of the memory device, like a memory controller or a memory array. Oversaturating the response queues can also decrease bandwidth and increase latency. A response queue can become full or "backed up" if, for instance, an internal interconnect or an external interconnect is too busy or is oversubscribed. For example, the "external" interconnect extending between the host device and the memory device may be oversubscribed by the host device or by other devices (e.g., other PCIe devices) that are coupled to the external interconnect. Additionally or alternatively, a relatively fast memory array may be providing memory responses faster than the memory device can empty them from one or more response queues thereof. In such cases, an unbridled credit-return system can cause at least one response queue of the memory device to become filled. A full response queue can further slow the memory device sufficiently to adversely impact bandwidth and latency.

Decreased processing bandwidth and increased latency for a memory device may be categorized as poor performance. Slow or otherwise poor memory performance can cause system-wide problems and create user dissatisfaction. Especially if the poor performance conflicts with advertised performance capabilities or a published technical specification, such as a quality-of-service (QoS) indication, the user may blame the manufacturer of the memory device. This can happen even if the host device or another device that is coupled to the interconnect is contributing to the bandwidth and latency issues by overusing the shared external interconnect. Further, the misplaced blame can occur if the host device is sending too many memory requests to the memory device due to an inadequate credit-based communications scheme.

To address this situation, and at least partly ameliorate it, this document describes example approaches to managing the flow of memory requests using a credit-based system. In some implementations, a memory-side controller of a memory device can monitor a quantity of memory responses that are present in a response queue of the memory device, including in a memory response queue of the memory-side controller. The memory-side controller can modulate one or more credits being returned to a host-side controller based on the quantity of memory responses that are present in the memory response queue. Thus, credit returns may be conditioned on how many memory responses are stored within the memory response queue, as well as perhaps on the number of memory requests that are within a memory request queue of the memory-side controller.

In other implementations, a memory-side controller of a memory device can include a response queue to store multiple memory responses that have been received from backend memory components. These multiple memory responses can correspond to multiple memory requests (e.g., from a host device), and the memory-side controller is to transmit the memory responses to the host-side controller. The memory-side controller can additionally include credit logic having a counter to store a value. The credit logic can adjust the value of the counter to track a quantity of memory responses that are present in the response queue. In some cases, the credit logic increments the value responsive to receiving a memory response (e.g., from a backend memory component) and decrements the value responsive to transmission of a memory response of the multiple memory responses from the response queue (e.g., to the host device).

The credit logic can manage credit returns to a host-side controller based on the value stored in the counter and a lookup table by changing a rate at which the credit returns are transmitted to the host-side controller. In this context, the rate may relate to a number of memory responses to be transmitted for each credit return to be transmitted. The lookup table can provide the number "N" of memory responses to be transmitted per credit return transmission based on the value of the counter. To change the rate of credit return transmissions, the credit logic may block credit returns for the memory response transmissions in each interval except for one memory response transmission responsive to the value stored in the counter. The credit logic may further permit a credit return a certain number of times (e.g., once) per interval to accompany a memory response being transmitted to the host-side controller.

The lookup table may include multiple entries, with each entry associated with a respective range of quantities that maps to a corresponding number "N" of memory response transmissions. Each range of quantities can relate to a quantity of memory responses stored in the response queue at the memory device. Thus, using the lookup table to obtain the number "N," the memory-side controller can adjust a rate of credit return transmissions by transmitting a credit return with each "Nth" memory response transmission. In these manners, the value of the counter, which indicates a current quantity of memory responses in the response queue, can at least partially control a rate of reception of new memory requests.

By employing one or more of these implementations, a memory device can obtain greater control over the flow of memory requests received from a host device. The memory device can modulate a quantity of memory responses stored at the memory-side controller and/or a rate at which credit returns are transmitted to the host device and, therefore, a rate at which memory requests are received from the host device over time. By throttling the arrival of the memory requests, a memory device can avoid becoming so saturated with memory requests that bandwidth or latency is adversely impacted. Thus, using the techniques described herein, manufacturers can produce memory devices that are better able to provide some specified quality of service in terms of bandwidth or latency. Although some implementations are described above in terms of a memory request and a memory device performing certain techniques, other device types may alternatively perform the techniques with requests generally. Examples of non-memory implementations are described further herein.

Example Operating Environments

FIG. 1 illustrates, at 100 generally, example apparatuses 102 that can implement response-based interconnect control. The apparatus 102 can be realized as, for example, at least one electronic device. Example electronic-device implementations include an internet-of-things (IoTs) device 102-1, a tablet device 102-2, a smartphone 102-3, a notebook computer 102-4 (or a desktop computer), a passenger vehicle 102-5 (or other vehicle), a server computer 102-6, a server cluster 102-7 that may be part of cloud computing infrastructure or a data center, and any portion thereof (e.g., a printed circuit board (PCB) or module component of a device).

Other examples of the apparatus 102 include a wearable device, such as a smartwatch or intelligent glasses; an entertainment device, such as a set-top box or streaming dongle, a smart television, a gaming device, or virtual reality (VR) goggles; a motherboard or blade of a server; a consumer appliance; a vehicle or drone, or the electronic components thereof; industrial equipment; a security or other sensor device; and so forth. Each type of electronic device or other apparatus can include one or more components to provide some computing functionality or feature that is enabled or enhanced by the hardware or techniques that are described herein.

In example implementations, the apparatus 102 can include at least one host device 104, at least one interconnect 106, and at least one memory device 108. The host device 104 can include at least one processor 114, at least one cache memory 116, and at least one controller 118. The memory device 108 may include at least one controller 110 and at least one memory 112. The memory 112 may be realized with one or more memory types.

The memory 112 may be realized, for example, with a dynamic random-access memory (DRAM) die or module, including with a three-dimensional (3D) stacked DRAM device, such as a high bandwidth memory (HBM) device or a hybrid memory cube (HMC) device. DRAM may include, for instance, synchronous DRAM (SDRAM) or double data rate (DDR) DRAM (DDR DRAM). The memory 112 may also be realized using static random-access memory (SRAM). Thus, the memory device 108 may operate as a main memory or a cache memory, including as both. Additionally or alternatively, the memory device 108 may operate as storage memory. In such cases, the memory 112 may be realized, for example, with a storage-class memory type, such as one employing 3D XPoint™ or phase-change memory (PCM), flash memory, a magnetic hard disk, or a solid-state drive (e.g., a Non-Volatile Memory Express® (NVMe®) device).

Regarding the host device 104, the processor 114 can be coupled to the cache memory 116, and the cache memory 116 can be coupled to the controller 118. The processor 114 can also be coupled to the controller 118 directly or indirectly (e.g., via the cache memory 116 as depicted). The host device 104 may include other components to form, for instance, a system-on-a-chip or a system-on-chip (SoC). The processor 114 may include or comprise a general-purpose processor, a central processing unit (CPU), a graphics processing unit (GPU), a neural network engine or accelerator, an application-specific integrated circuit (ASIC), a field-programmable gate array (FPGA) integrated circuit (IC), a communication processor (e.g., a modem or baseband processor), an SoC, and so forth.

In operation, the controller 118 can provide a high-level or logical interface between the processor 114 and at least one memory device, such as a memory that is external to the host device 104. The controller 118 can, for example, receive memory requests from the processor 114 and provide the memory requests to an external memory with appropriate formatting, packaging, timing, reordering, and so forth. The controller 118 can forward to the processor 114 responses to the memory requests that the controller 118 receives from the external memory.

The controller 118 may communicate with multiple memory devices, or other types of devices—some of which may include one or more memory components, over one or more interconnects, such as the interconnect 106. Regarding connections that are external to the host device 104, the host device 104 can be coupled to the memory device 108 via the interconnect 106. The memory device 108 may be coupled to, or may include, a main memory or a storage memory, including both in some cases. Another device, such as a cache memory or a switch, may be coupled between the host device 104 and the memory device 108 and may be part of or separate from the interconnect 106.

The depicted interconnect 106, as well as other interconnects (not shown) that communicatively couple together various components, enables data to be transferred between two or more components of the various components. Interconnect examples include a bus, a switching fabric, a crossbar, one or more wires that carry voltage or current signals, and so forth. Each interconnect may be implemented as a unidirectional interconnect or a bidirectional interconnect. The interconnect 106 can be implemented as a parallel propagation pathway. For example, the interconnect 106 can include at least one command and address bus and at least one data bus, each of which carries multiple bits of a particular item of information (e.g., a data byte) simultaneously each clock period. Alternatively, the interconnect 106 can be implemented as a serial propagation pathway that carries one bit of a particular item of information each clock cycle. For instance, the interconnect 106 can comport with a PCIe standard, such as version 4, 5, 6, or a future version. The interconnect 106 may include multiple serial propagation pathways, such as multiple lanes in a PCIe implementation.

The components of the apparatus 102 that are depicted in FIG. 1 represent an example computing architecture that may include a hierarchical memory system. A hierarchical memory system can include memories at different levels, with each level having a memory with a different speed, capacity, or volatile/nonvolatile characteristic. Thus, the memory device 108 may be described in terms of forming at least part of a main memory of the apparatus 102. The memory device 108 may, however, form at least part of a cache memory, a storage memory, an SoC, and so forth of an apparatus 102.

Although various implementations of the apparatus 102 are depicted in FIG. 1 and described herein, an apparatus 102 can be implemented in alternative manners. For example, the host device 104 may include multiple cache memories, including multiple levels of cache memory, or may omit a cache memory. A memory, such as the memory device 108, may have a respective "internal" or "local" cache memory (not shown). In some cases, the host device 104 may omit the processor 114 and/or include other logic. Generally, the illustrated and described components may be implemented in alternative ways, including in distributed or shared memory systems. A given apparatus 102 may also include more, fewer, or different components than those depicted in FIG. 1 or described herein.

The host device 104 and any of the various memories may be realized in multiple manners. In some cases, the host device 104 and the memory device 108 may be located on separate blades or racks in a server computing environment. In other cases, the host device 104 and the memory device 108 can both be disposed on, or physically supported by, a same printed circuit board (PCB) (e.g., a rigid or flexible motherboard or PCB assembly). The host device 104 and the memory device 108 may also be integrated on a same IC or fabricated on separate ICs but packaged together.

A memory device 108 may also be coupled to multiple host devices 104 via one or more interconnects 106 and may be able to respond to memory requests from two or more of the multiple host devices 104. Each host device 104 may include a respective controller 118, or the multiple host devices 104 may share a common controller 118. An example computing system architecture with at least one host device 104 that is coupled to a memory device 108 is described below with reference to FIG. 2.

With continuing reference to FIG. 1, however, the interconnect 106 may propagate one or more communications. The host device 104 and the memory device 108 may exchange at least one memory request/memory response 120. For example, the controller 118 may transmit a memory request to the controller 110 over the interconnect 106. Thus, the controller 110 may transmit a corresponding memory response to the controller 118 over the interconnect 106. In some cases, the interconnect 106 is operated in accordance with a credit-based protocol. Accordingly, credit-related information 122 may be exchanged between the host device 104 and the memory device 108. For instance, the controller 110 may transmit a credit return to the controller 118 to enable the controller 118 to transmit another memory request. In some cases, the credit-related information 122 and a memory request or memory response 120 may be combined into a joint, shared, or overlapping communication, such as a packet or a flit.

Thus, the memory device 108 and the host device 104 can communicate using a credit-based protocol over the interconnect 106. The controller 110 of the memory device 108 can include credit logic 124, and the controller 118 of the host device 104 can include credit logic 126. In example implementations, the credit logic 124 and/or the credit logic 126 can facilitate communication over the interconnect 106 using at least one protocol that operates based on credits.

A credit-based protocol can use tokens or another quantity-based permissions scheme to authorize an initiator and/or a target to communicate with the target and/or the initiator, respectively. For example, the controller 118 may transmit a communication (e.g., a memory request) over the interconnect 106 to the controller 110 responsive to possessing at least one credit that "authorizes" the transmission. This transmission, however, "consumes" the at least one credit. Examples of credit-based protocols are described below with reference to FIGS. 4 and 5.

In example implementations, the credit logic 124 of the controller 110 can moderate the flow of communications from the controller 118. To do so, the credit logic 124 can modulate the frequency or rate at which the credit logic 124 returns credits to the credit logic 126 of the controller 118. Withholding or delaying credit returns can slow, or even stop, the transmission of memory requests from the host device 104 to the memory device 108 if the memory device 108 becomes oversaturated with in-progress memory requests and/or queued memory responses. Example techniques for modulating such credit returns are described herein to increase the bandwidth for memory-request processing or to decrease memory response latency, including to achieve both. For instance, the credit logic 124 can delay or slow the return of credits to the credit logic 126 of the controller 118 based on a quantity of memory responses that are stored in at least one response queue of the controller 110. Example implementations are described further with reference to FIGS. 6-11.

In some implementations, the apparatus 102 operates with one or more protocols over the interconnect 106. The apparatus 102 can operate, for example, a Compute Express Link' (CXL) protocol across the interconnect 106. In at least some of these cases, the apparatus 102 can overlay the CXL protocol on top of a PCIe protocol for the physical layer. Thus, the controller 118 can comport with a CXL standard or a PCIe standard, including comporting with both. Similarly, the controller 110 can comport with a CXL standard or a PCIe standard, including with both. Examples of credit-based aspects of at least one version of a CXL standard are described below with reference to FIGS. 4 and 5. Other circuitry, techniques, and mechanisms are also described below. Next, however, this document describes example computing architectures with one or more processors and a memory device.

Figure 2:
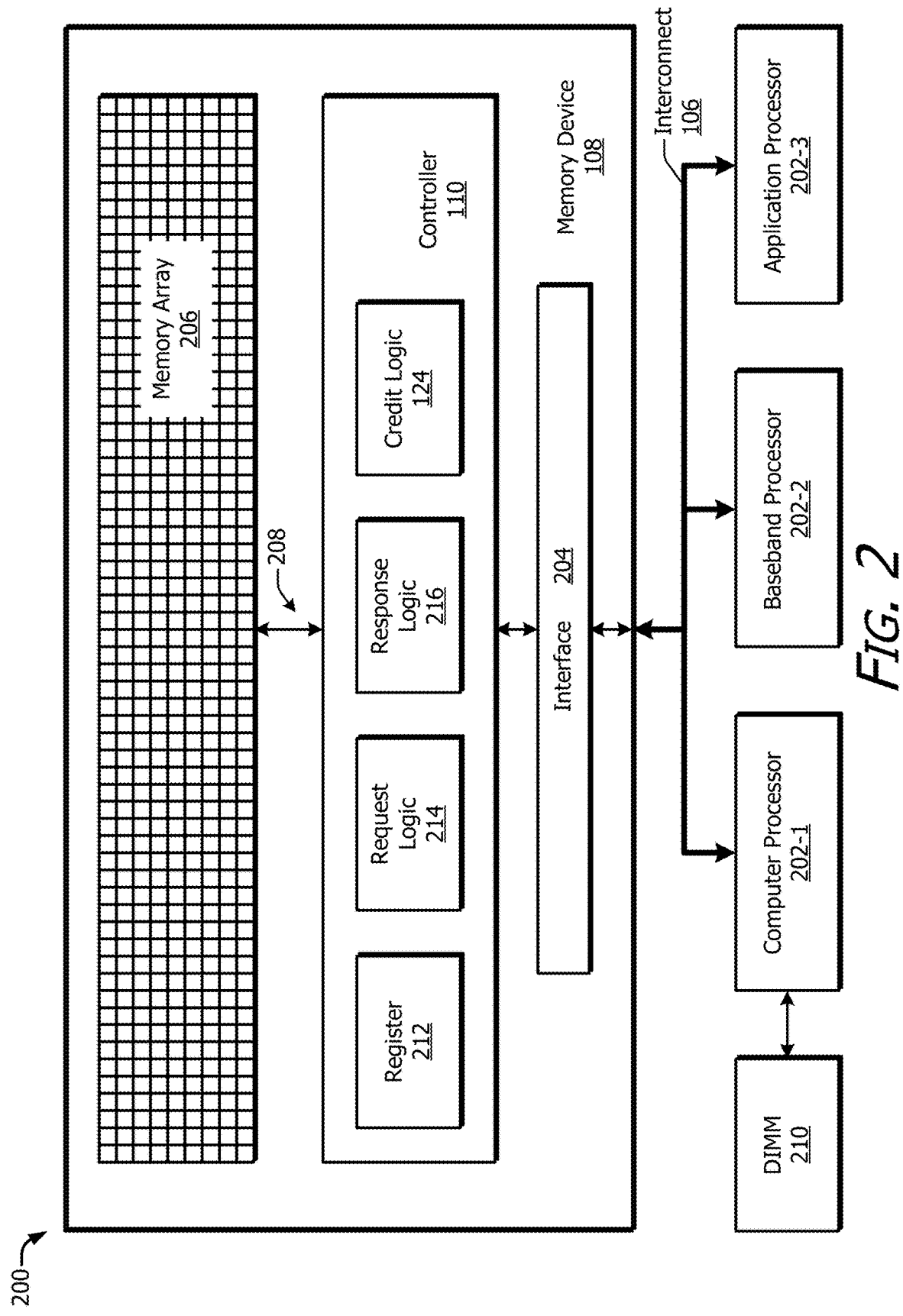
FIG. 2 illustrates example computing systems that can implement aspects of response-based interconnect control with a memory device.

FIG. 2 illustrates an example computing system 200 that can implement aspects of response-based interconnect control with a memory device. In some implementations, the computing system 200 includes at least one memory device 108, at least one interconnect 106, and at least one processor 202. The memory device 108 can include, or be associated with, at least one memory array 206, at least one interface 204, and at least one controller 110. The at least one controller 110 can be communicatively coupled to the memory array 206 via at least one interconnect 208 (e.g., an "internal" interconnect). The memory array 206 and the controller 110 may be components that are integrated on a single semiconductor die or that are located on separate semiconductor dies (e.g., but still coupled to or disposed on a same PCB). Each of the memory array 206 or the controller 110 may also be distributed across multiple dies (or dices).

The memory device 108 can correspond, for example, to one or more of a cache memory, main memory, or storage memory of the apparatus 102 of FIG. 1. Thus, the memory array 206 can include an array of memory cells. These memory cells can include, but are not limited to, memory cells of Static Random-Access Memory (SRAM), Dynamic Random-Access Memory (DRAM), Synchronous DRAM (SDRAM), three-dimensional (3D) stacked DRAM, Double Data Rate (DDR) memory, low-power Dynamic Random-Access Memory (DRAM), Low-Power Double Data Rate (LPDDR) Synchronous Dynamic Random-Access Memory (SDRAM), phase-change memory (PCM), or flash memory.

The controller 110 can include any one or more of a number of components that can be used by the memory device 108 to perform various operations. These operations can include communicating with other devices, managing performance, modulating memory access rates, and performing memory read or write operations. For example, the controller 110 can include at least one register 212, at least one instance of request logic 214, at least one instance of response logic 216, and at least one instance of credit logic 124.

The register 212 may be implemented, for example, as one or more registers that can store information to be used by the controller 110, by another part of the memory device 108, or by a part of a host device 104, such as a controller 118 as depicted in FIG. 1. A register 212 may store, for instance, a maximum credit level, a parameter controlling part of a communication-flow modulation process using credits (e.g., a register 718 of FIG. 7), and so forth. The controller 110 may also include one or more counters, as is described below. The request logic 214 can process one or more memory requests, such as by formulating a request, directing a request to a next or final destination, or performing a memory access operation (e.g., a read or a write operation).

The response logic 216 can prepare at least one memory response, such as by obtaining requested data or generating a write acknowledgement. The credit logic 124 can modulate the flow of memory requests across the interconnect 106 using credits, which are described further below, including with reference to FIG. 4. Although depicted separately, the components of the controller 110 may be nested with respect to each other, may be at least partially overlapping with another component, and so forth.

The interface 204 can couple the controller 110 or the memory array 206 directly or indirectly to the interconnect 106. As shown in FIG. 2, the register 212, the request logic 214, the response logic 216, and the credit logic 124 can be part of a single component (e.g., the controller 110). In other implementations, one or more of the register 212, the request logic 214, the response logic 216, or the credit logic 124 may be implemented as separate components, which can be provided on a single semiconductor die or disposed across multiple semiconductor dies. These components of the controller 110 may be individually or jointly coupled to the interconnect 106 via the interface 204.

The interconnect 106 may be implemented with any one or more of a variety of interconnects that communicatively couple together various components and enable commands, addresses, messages, packets, and/or other information and data to be transferred between two or more of the various components (e.g., between the memory device 108 and any of the one or more processors 202). The information and data may be propagated over the interconnect 106 "directly" or using some form of encapsulation or packaging, such as with packets, frames, or flits. Although the interconnect 106 is represented with a single line or arrow in FIG. 2, the interconnect 106 may include at least one bus, at least one switching fabric, at least one crossbar, one or more wires or traces that carry voltage or current signals, at least one switch, one or more buffers, at least one lane, and so forth.

In some aspects, the memory device 108 may be realized as a "separate" physical component relative to the host device 104 (of FIG. 1) or any of the processors 202. Examples of physical components that may be separate include, but are not limited to, a printed circuit board (PCB), which can be rigid or flexible; a memory card; a memory stick; and a memory module, including a single in-line memory module (SIMM), a dual in-line memory module (DIMM), or a non-volatile memory express (NVMe) module. Thus, separate physical components may be located together within a same housing of an electronic device or a memory product, or such physical components may be distributed over a server rack, a data center, and so forth. Alternatively, the memory device 108 may be packaged or integrated with other physical components, including a host device 104 or a processor 202, such as by being disposed on a common PCB, combined together in a single device package, or integrated into an SoC of an apparatus.

As shown in FIG. 2, the one or more processors 202 may include a computer processor 202-1, a baseband processor 202-2, and an application processor 202-3, which are coupled to the memory device 108 through the interconnect 106. The processors 202 may each be, or may form a part of, a CPU, a GPU, an SoC, an ASIC, an FPGA, or the like. In some cases, a single "processor" can comprise multiple processing cores or resources, each dedicated to different functions, such as modem management, applications, graphics, central processing, neural network acceleration, or the like. In some implementations, the baseband processor 202-2 may include or be coupled to a modem (not shown in FIG. 2) and may be referred to as a modem processor. The modem and/or the baseband processor 202-2 may be coupled wirelessly to a network via, for example, cellular, Wi-Fi®, Bluetooth®, ultra-wideband (UWB), near field, or another technology or protocol for wireless communication.

In various implementations, the processors 202 may be connected to different memories in different manners. For example, the processors 202 may be connected directly to the memory device 108 (e.g., via the interconnect 106 as shown). Alternatively, one or more of the processors 202 may be indirectly connected to the memory device 108, such as over a network connection, through one or more other devices or components, and/or using at least one other additional interconnect. Each processor 202 may be realized similarly to the processor 114 of FIG. 1. Accordingly, a respective processor 202 can include or be associated with a respective controller, like the controller 118 depicted in FIG. 1. Alternatively, two or more processors 202 may access the memory device 108 using a shared or system controller 118. In any of such cases, the controller 118 may include credit logic 126 (e.g., of FIG. 1). Each processor 202 may also be separately connected to a respective memory. As shown, the computer processor 202-1 may be coupled to at least one DIMM 210 that is inserted into a DIMM slot of a motherboard. The DIMM 210 can be coupled to a memory controller (not shown), which may be part of the computer processor 202-1.

The apparatuses and methods that are described herein may be appropriate for memory that is designed for use with a PCIe bus. Thus, the described principles may be incorporated into a memory device with a PCIe interface. Further, the memory device can communicate over the interconnect 106 by overlaying a CXL protocol on the physical PCIe interface. An example of a memory standard that relates to CXL is promulgated by the Compute Express Link™ consortium and may include versions 1.0, 1.1, 2.0, and future versions. Thus, the host device 104 or the memory device 108, including both in some cases, may comport with at least one CXL standard. Accordingly, some terminology in this document may draw from one or more of these standards or versions thereof for clarity. The described principles, however, are also applicable to memories that comport with other standards, including earlier versions or future versions of such standards, and to memories that do not adhere to a public standard. Examples of systems that may include a PCIe interface and a CXL protocol overlay are described next with reference to FIG. 3.

Figure 3:
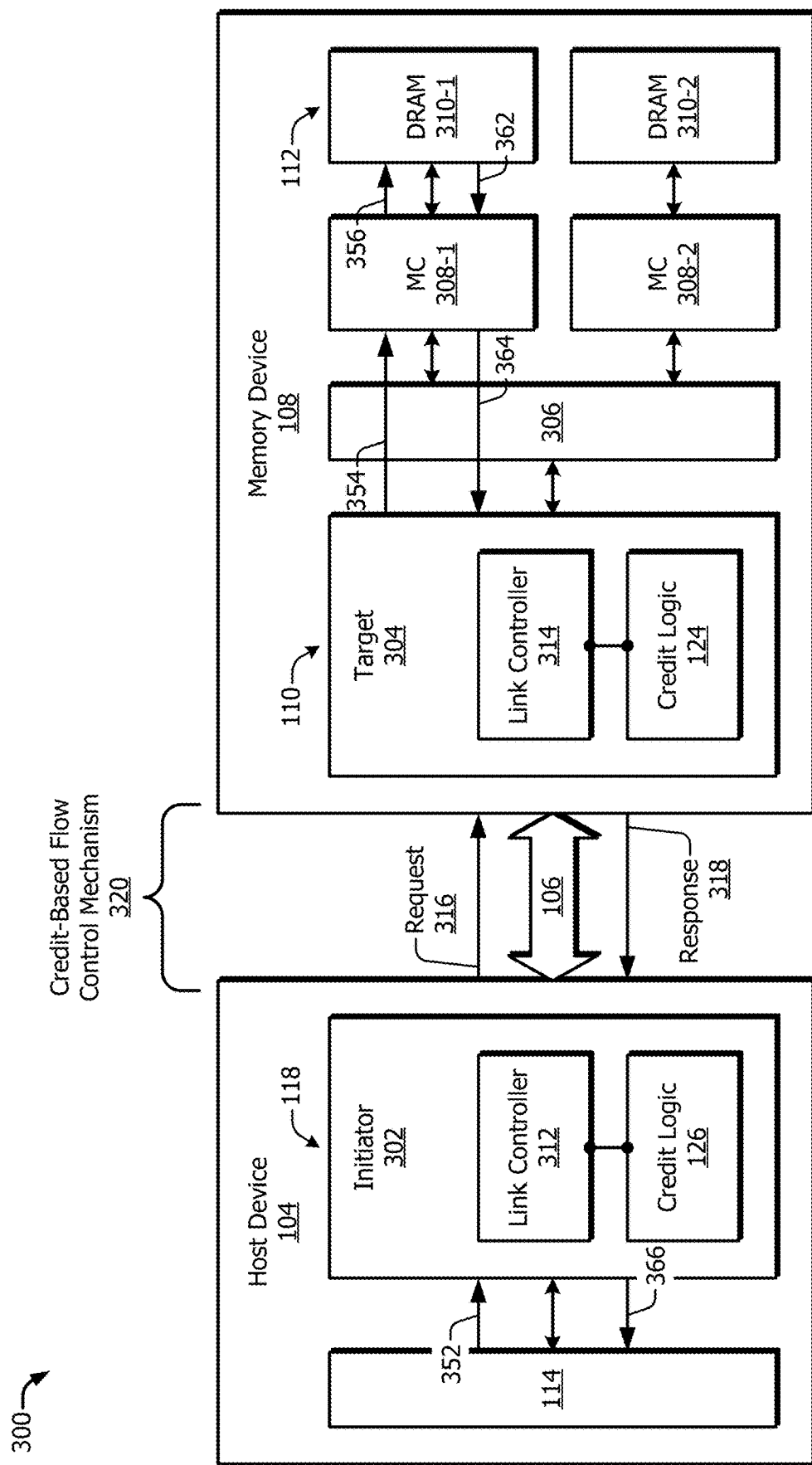
FIG. 3 illustrates examples of a system that can include a host device and a memory device coupled together via an interconnect and that can implement aspects of response-based interconnect control.

FIG. 3 illustrates examples of a system 300 that can include a host device 104 and a memory device 108 that are coupled together via an interconnect 106. The system 300 can implement aspects of response-based interconnect control and may form at least part of an apparatus 102 as shown in FIG. 1. As illustrated in FIG. 3, the host device 104 includes a processor 114 and a controller 118, which can be realized with at least one initiator 302. Thus, the initiator 302 can be coupled to the processor 114 or to the interconnect 106 (including to both), and the initiator 302 can be coupled between the processor 114 and the interconnect 106. Examples of initiators 302 may include a leader, a primary, a master, a requester or requesting component, a main component, and so forth.

In the illustrated example system 300, the memory device 108 includes a controller 110, which can be realized with at least one target 304. The target 304 can be coupled to the interconnect 106. Thus, the target 304 and the initiator 302 can be coupled to each other via the interconnect 106. Examples of targets 304 may include a follower, a secondary, a slave, a subordinate, a responder or responding component, a subsidiary component, and so forth. The memory device 108 also includes a memory 112. The memory 112 can be realized with at least one memory module or chip or with a memory array 206 (of FIG. 2) or another component, such as a DRAM 310, as is described below.

In example implementations, the initiator 302 includes at least one link controller 312, and the target 304 includes at least one link controller 314. The link controller 312 or the link controller 314 can instigate, coordinate, cause, or otherwise participate in or control signaling across a physical or logical link realized by the interconnect 106 in accordance with one or more protocols. The link controller 312 may be coupled to the interconnect 106. The link controller 314 may also be coupled to the interconnect 106. Thus, the link controller 312 can be coupled to the link controller 314 via the interconnect 106. Each link controller 312 or 314 may, for instance, control communications over the interconnect 106 at a link layer or at one or more other layers of a given protocol. Communication signaling may include, for example, a request 316, a response 318, and so forth.

The memory device 108 may further include at least one interconnect 306 and at least one memory controller 308 (MC 308). Within the memory device 108, and relative to the target 304, the interconnect 306, the memory controller 308, and/or the DRAM 310 (or other memory component) may be referred to as a "backend" or "downstream" component or memory component of the memory device 108. In some cases, the interconnect 306 is internal to the memory device 108 and may operate the same as or differently from the interconnect 106 or like the interconnect 208.

Thus, the memory device 108 can include at least one memory component. As shown, the memory device 108 may include multiple memory controllers 308-1 and 308-2 and/or multiple DRAMs 310-1 and 310-2. Although two of each are shown, the memory device 108 may include one or more than two memory controllers and/or one or more than two DRAMs. For example, a memory device 108 may include 4 memory controllers and 16 DRAMs, such as 4 DRAMs per memory controller. The memory 112 or memory components of the memory device 108 are depicted as DRAM as an example only, for one or more of the memory components may be implemented as another type of memory. For instance, the memory components may include nonvolatile memory like flash or PCM. Alternatively, the memory components may include other types of volatile memory like SRAM. Thus, the memory device 108 may include a dynamic random-access memory (DRAM) array, a static random-access memory (SRAM) array, or a nonvolatile memory array. A memory device 108 may also include any combination of memory types.

In some cases, the memory device 108 may include the target 304, the interconnect 306, the at least one memory controller 308, and the at least one DRAM 310 within a single housing or other enclosure. The enclosure, however, may be omitted or may be merged with one for the host device 104, the system 300, or an apparatus 102 (of FIG. 1). In some cases, each of these components can be realized with a separate IC. In some of such cases, the interconnect 306 can be disposed on a PCB. Each of the target 304, the memory controller 308, and the DRAM 310 may be fabricated on at least one IC and packaged together or separately. The packaged IC(s) may be secured to or otherwise supported by the PCB (or PCB assembly) and may be directly or indirectly coupled to the interconnect 306. In other cases, the target 304 of the controller 110, the interconnect 306, and the one or more memory controllers 308 may be integrated together into one IC. In some of such cases, this IC may be coupled to a PCB, and one or more modules for the memory components may also be coupled to the same PCB, which can form a CXL memory device 108. This memory device 108 may be enclosed within a housing or may include such a housing. The components of the memory device 108 may, however, be fabricated, packaged, combined, and/or housed in other manners.

As illustrated in FIG. 3, the target 304, including the link controller 314 thereof, can be coupled to the interconnect 306. Each memory controller 308 of the multiple memory controllers 308-1 and 308-2 can also be coupled to the interconnect 306. Accordingly, the target 304 and each memory controller 308 of the multiple memory controllers 308-1 and 308-2 can communicate with each other via the interconnect 306. Each memory controller 308 is coupled to at least one DRAM 310. As shown, each respective memory controller 308 of the multiple memory controllers 308-1 and 308-2 is coupled to at least one respective DRAM 310 of the multiple DRAMs 310-1 and 310-2. Each memory controller 308 of the multiple memory controllers 308-1 and 308-2 may, however, be coupled to a respective set of multiple DRAMs or other memory components.

Each memory controller 308 can access at least one DRAM 310 by implementing one or more memory access protocols to facilitate reading or writing data based on at least one memory address. The memory controller 308 can increase bandwidth or reduce latency for the memory accessing based on a type of the memory or an organization of the memory components, such as the multiple DRAMs. The multiple memory controllers 308-1 and 308-2 and the multiple DRAMs 310-1 and 310-2 can be organized in many different manners. For example, each memory controller 308 can realize one or more memory channels for accessing the DRAMs. Further, the DRAMs can be manufactured to include one or more ranks, such as a single-rank or a dual-rank memory module. Each DRAM 310 (e.g., at least one DRAM IC chip) may also include multiple banks, such as 8 or 16 banks.

A forward path of the memory device 108 may include one or more memory request queues. A return path of the memory device 108 may include one or more memory response queues. These queues may be present in, for example, the controller 110, a memory controller 308, a memory array, such as the DRAM 310, and so forth. Examples of a forward path and a return path are described next as part of an accessing operation for the memory device 108.

This document now describes examples of the host device 104 accessing the memory device 108. The examples are described in terms of a general memory access (e.g., a memory request) which may include a memory read access (e.g., a memory read request for a data retrieval operation) or a memory write access (e.g., a memory write request for a data storage operation). The processor 114 can provide a memory access request 352 to the initiator 302. The memory access request 352 may be propagated over a bus or other interconnect that is internal to the host device 104. This memory access request 352 may be or may include a read request or a write request. The initiator 302, such as the link controller 312 thereof, can reformulate the memory access request 352 into a format that is suitable for the interconnect 106. This reformulation may be performed based on a physical protocol or a logical protocol (including both) applicable to the interconnect 106. Examples of such protocols are described below.

The initiator 302 can thus prepare a request 316 and transmit the request 316 over the interconnect 106 to the target 304. The target 304 receives the request 316 from the initiator 302 via the interconnect 106. The target 304, including the link controller 314 thereof, can process the request 316 to determine (e.g., extract, decode, or interpret)

the memory access request. Based on the determined memory access request, and as part of the forward path of the memory device 108, the target 304 can forward a memory request 354 over the interconnect 306 to a memory controller 308, which is the first memory controller 308-1 in this example. For other memory accesses, the targeted data may be accessed with the second DRAM 310-2 through the second memory controller 308-2. Thus, the first memory controller 308-1 receives the memory request 354 via the internal interconnect 306.

The first memory controller 308-1 can prepare a memory command 356 based on the memory request 354. The first memory controller 308-1 can provide the memory command 356 to the first DRAM 310-1 over an interface or interconnect appropriate for the type of DRAM or other memory component. The first DRAM 310-1 receives the memory command 356 from the first memory controller 308-1 and can perform the corresponding memory operation. Based on the results of the memory operation, the first DRAM 310-1 can generate a memory response 362. If the memory request 316 is for a read operation, the memory response 362 can include the requested data. If the memory request 316 is for a write operation, the memory response 362 can include an acknowledgement that the write operation was performed successfully. As part of the return path of the memory device 108, the first DRAM 310-1 can provide the memory response 362 to the first memory controller 308-1.

Continuing the return path of the memory device 108, the first memory controller 308-1 receives the memory response 362 from the first DRAM 310-1. Based on the memory response 362, the first memory controller 308-1 can prepare a memory response 364 and transmit the memory response 364 to the target 304 via the interconnect 306. The target 304 receives the memory response 364 from the first memory controller 308-1 via the interconnect 306. Based on this memory response 364, and responsive to the corresponding memory request 316, the target 304 can formulate a response 318 for the requested memory operation. The memory response 318 can include read data or a write acknowledgement and be formulated in accordance with one or more protocols of the interconnect 106.

To respond to the memory request 316 from the host device 104, the target 304 of the memory device 108 can transmit the memory response 318 to the initiator 302 over the interconnect 106. Thus, the initiator 302 receives the response 318 from the target 304 via the interconnect 106. The initiator 302 can therefore respond to the "originating" memory access request 352, which is from the processor 114 in this example. To do so, the initiator 302 prepares a memory access response 366 using the information from the response 318 and provides the memory access response 366 to the processor 114. In these manners, the host device 104 can obtain memory access services from the memory device 108 using the interconnect 106. Example aspects of an interconnect 106 are described next.

The interconnect 106 can be implemented in a myriad of manners to enable memory-related communications to be exchanged between the initiator 302 and the target 304. Generally, the interconnect 106 can carry memory-related information, such as data or a memory address, between the initiator 302 and the target 304. In some cases, the initiator 302 or the target 304 (including both) can prepare memory-related information for communication across the interconnect 106 by encapsulating such information. The memory-related information can be encapsulated or incorporated into, for example, at least one packet (e.g., at least one flit). One or more packets may include at least one header with information indicating or describing the content of each packet.

In example implementations, the interconnect 106 can support, enforce, or enable memory coherency for a shared memory system, for a cache memory, for combinations thereof, and so forth. Thus, the memory device 108 can operate in a cache coherent memory domain in some cases. Additionally or alternatively, the interconnect 106 can be operated based on a credit allocation system. Thus, the initiator 302 and the target 304 can communicate using, for example, a credit-based flow control mechanism 320. Possession of a credit can enable an entity, such as the initiator 302, to transmit another memory request 316 to the target 304. The target 304 may return credits to "refill" a credit balance at the initiator 302. The credit logic 124 of the target 304 or the credit logic 126 of the initiator 302 (including both instances of credit logic working together in tandem) can implement a credit-based communication scheme across the interconnect 106. Example aspects of credit-based communication protocols are described below with reference to FIGS. 4 and 5.

The system 300, the initiator 302 of the host device 104, or the target 304 of the memory device 108 may operate or interface with the interconnect 106 in accordance with one or more physical or logical protocols. For example, the interconnect 106 may be built in accordance with a Peripheral Component Interconnect Express® (PCIe or PCI-E) standard. Applicable versions of the PCIe standard may include 1.x, 2.x, 3.x, 4.0, 5.0, 6.0, and future or alternative versions of the standard.

In some cases, at least one other standard is layered over the physical-oriented PCIe standard. For example, the initiator 302 or the target 304 can communicate over the interconnect 106 in accordance with a Compute Express Link™ (CXL) standard. Applicable versions of the CXL standard may include 1.x, 2.0, and future or alternative versions of the standard. Thus, the initiator 302 and/or the target 304 may operate so as to comport with a PCIe standard and/or a CXL standard. A device or component may comprise or operate in accordance with a CXL Type 1, Type 2, or Type 3 device. A CXL standard may operate based on credits, such as request credits, response credits, and data credits. Example aspects of credit types, credit allocation, credit usage, and flow control via credits are described next with reference to FIGS. 4 and 5.

Example Techniques and Hardware

Figure 4:
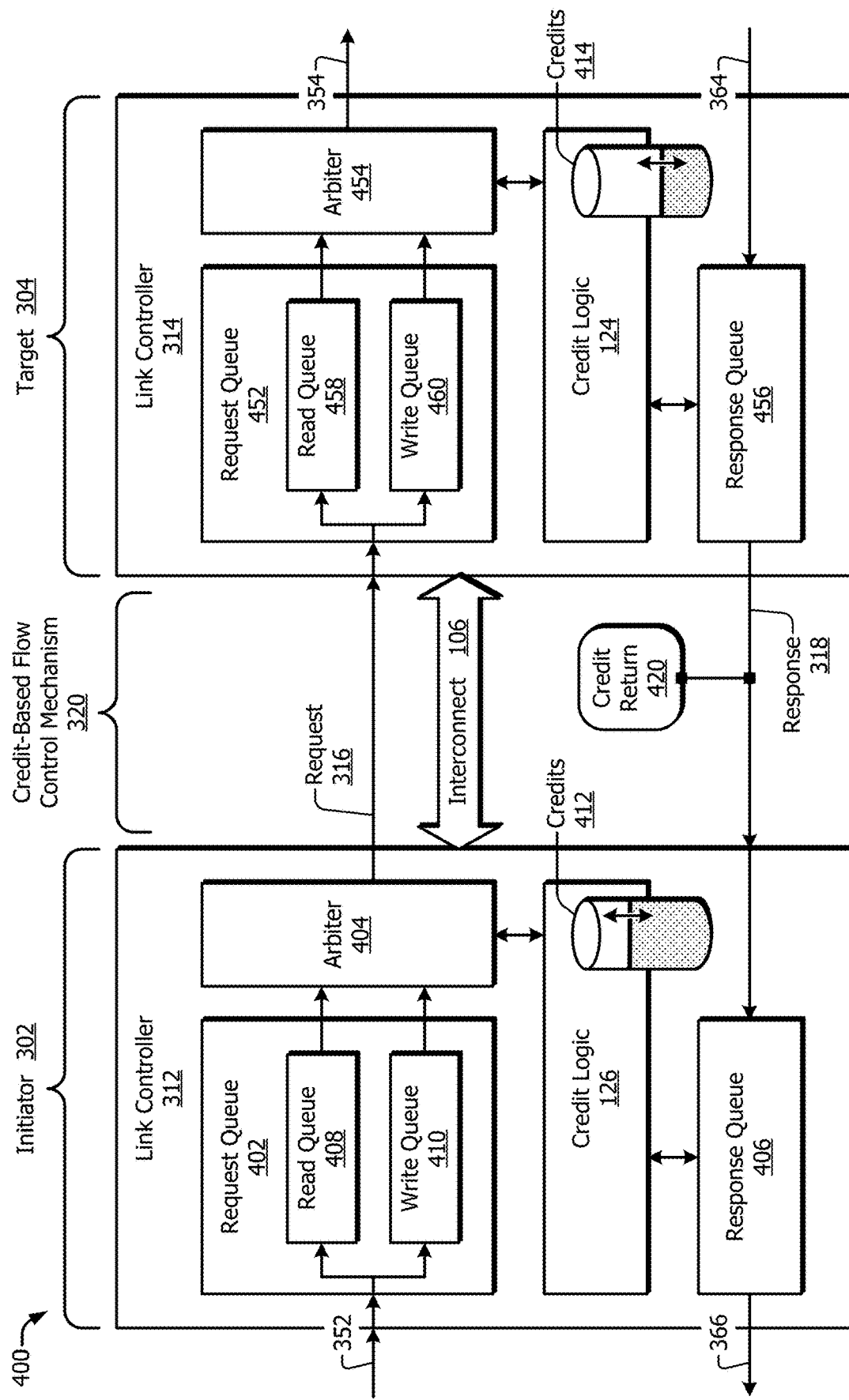
FIG. 4 illustrates examples of controllers for an initiator and a target that can communicate across an interconnect that employs a credit-based protocol and that can implement aspects of response-based interconnect control.

FIG. 4 illustrates, at 400 generally, examples of controllers for an initiator 302 and a target 304 that can communicate across an interconnect 106 that employs a credit-based protocol and that can implement aspects of response-based interconnect control. The initiator 302 can include a link controller 312, and the target 304 can include a link controller 314. As also shown in FIGS. 1 and 3, the link controller 312 can include credit logic 126, and the link controller 314 can include credit logic 124. The credit logic 124 and the credit logic 126 can support implementations of a credit-based flow control mechanism 320 that authorizes or permits one or more communications based on possession of at least one credit.

In example implementations, the link controller 312 or the link controller 314, including both link controllers, can communicate across the interconnect 106 in accordance with a credit-based protocol. A credit-based protocol can be realized using, for instance, the credit-based flow control mechanism 320. To do so, the credit logic 126 can monitor a quantity of one or more credits 412, and the credit logic 124 can monitor one or more credits 414. Generally, the credit logic 126 permits the link controller 312 to transmit a communication, such as a request 316, to the link controller 314 based on the one or more credits 412. Transmitting the request 316 may use or "consume" one credit of the one or more credits 412. Based on the one or more credits 414 that are to be returned, the credit logic 124 at the link controller 314 can modulate the rate of transmission from the link controller 312 by managing the transmission of at least one credit return 420. The credit return 420 can replenish an indicated quantity of the one or more credits 412 at the credit logic 126. This credit usage is described further below.

As illustrated in FIG. 4, the link controller 312 can include at least one request queue 402, at least one arbiter 404, at least one response queue 406, and at least one instance of the credit logic 126. The link controller 314 can include at least one request queue 452, at least one arbiter 454, at least one response queue 456, and at least one instance of the credit logic 124. In some cases, a request queue 402 or 452 may be split into a read path and a write path. Thus, the request queue 402 may include at least one read queue 408 and at least one write queue 410. Similarly, the request queue 452 may include at least one read queue 458 and at least one write queue 460. Additionally or alternatively, although not shown in FIG. 4, a response queue 406 or 456 may be split into a read path and a write path. Thus, the response queue 406 may include at least one read response queue and at least one write response queue for the link controller 312. Similarly, the response queue 456 may include at least one read response queue and at least one write response queue for the link controller 314.

In example operations for an initiator 302, the link controller 312 can receive a memory access request 352 at the request queue 402. The request queue 402 routes the request into the read queue 408 or the write queue 410 based on whether the memory access request is for a read operation or a write operation, respectively. The arbiter 404 controls access to the interconnect 106 based on instructions or commands from the credit logic 126. The credit logic 126 authorizes the arbiter 404 to transmit a request 316 over the interconnect 106 based on possession of the one or more credits 412. For example, the credit logic 126 may permit the arbiter 404 to transmit one request 316 per one available credit 412 (e.g., a one-to-one ratio of request transmission to credit). If the credit logic 126 does not currently possess any credits 412, the arbiter 404 can be prevented from transmitting a request 316 (e.g., by the credit logic 126 blocking or not authorizing such a transmission).

The response queue 406 can buffer multiple responses 318 received from the link controller 314 via the interconnect 106. Each response 318 may include a least one memory response (e.g., with read data or a write acknowledgment) or at least one credit return 420, including the memory response and the credit return in some transmissions. Thus, a response 318 may include a credit return 420 bundled with a memory response. For a memory response, the response queue 406 buffers the response until the response queue 406 can provide the memory access response 366 to the processor 114 (of FIGS. 1 and 3). For a credit return 420, the response queue 406, including associated logic, can forward the quantity of credits returned 420 to the credit logic 126. Alternatively, separate circuitry of the link controller 312 may provide the credit return 420 to the credit logic 126. Based on the credit return 420, the credit logic 126 can replenish at least a portion of the credits 412.

Continuing with example operations, but for a target 304, the link controller 314 can receive the request 316 at the request queue 452. The request queue 452 can then route the request 316 into the read queue 458 or the write queue 460 depending on whether it is a read request or a write request, respectively. The arbiter 454 can select a read request from the read queue 458 or a write request from the write queue 460 for transmission as the memory request 354 to a backend component, such as a memory controller. Responsive to transmission of a memory request 354, which corresponds to a request 316 that was stored in the request queue 452, the arbiter 454 notifies the credit logic 124 that the request 316 has been transmitted to a backend component of the memory device 108 (e.g., of FIGS. 1-3). Accordingly, the credit logic 124 can add a credit 414 to the collection of one or more credits 414 that are earmarked to be returned to the link controller 312.

Thus, the credit logic 124 can track (e.g., maintain a record of) how many credits 414 can be returned to the credit logic 126 because the link controller 314 has forwarded a corresponding request 316 from the request queue 452 to a downstream component of the memory device 108. The credit logic 124 can communicate with the response queue 456 responsive to the presence of credits 414 that are to be returned to the credit logic 126. When a memory response 364 is received at the response queue 456, the response queue 456 can store the memory response 364. In conjunction with transmitting to the link controller 312 the memory response 364 as a response 318, the response queue 456 can include at least one credit return 420 (e.g., in a same FLIT or other packet). The credit return 420 can indicate a quantity of one or more credits 414 that are being returned to the credit logic 126 to increase the quantity of credits 412.

In these manners, the link controller 314 can use the credit-based protocol to control (e.g., block, gate, modulate, or moderate) the flow of requests 316 from the link controller 312. This can enable the link controller 314 to prevent the request queue 452 from overflowing from receiving too many requests 316 (e.g., from receiving requests 316 faster than the requests can be forwarded to downstream memory components). Additionally or alternatively, a credit-based protocol can also be used by the link controller 312 to control the flow of responses 318 from the link controller 314 to the link controller 312. The response queue 456 of the link controller 314 may be blocked from transmitting a response 318 unless the credit logic 124 has a "response" credit (not separately shown in FIG. 4) to authorize such a response transmission. These response credits may be different from the one or more "request" credits 414 relating to the requests 316. In such scenarios, the credit logic 126 of the link controller 312 may return the response credits to the credit logic 124 responsive to issuances of memory access responses 366 from the response queue 406. Hence, the initiator 302 and the target 304 can implement the credit-based flow control mechanism 320 bidirectionally.

Various approaches can be employed for a credit-based communication protocol. For example, a credit may correspond to a transmission across an interconnect, to a packet, to a flit, or to a request or response. A single credit may correspond to a single instance of any of the preceding examples or to multiple instances of such examples. In some cases a transmission may include multiple requests and/or multiple responses, such as by encapsulating them into a packet or flit. In some systems, a credit may correspond generally to any type of request or response so that, e.g., an initiator can transmit any kind of request or response if the initiator possesses a credit. Additionally or alternatively, a credit may be specific to one or more types of requests or responses or other communications. Examples of communication types can include requests, responses, read-related transmissions, write-related transmissions, read-related requests, write-related requests, read-related responses, and write-related responses. Credits may also be particular to whether or not data is allowed to be included in the corresponding transmission. These and other communication traits may be further combined to create still-more specific types of credits.

By way of example, but not limitation, this document describes some implementations in terms of a credit protocol employed by certain CXL systems. Generally, from the perspective of a memory device, the credit-based flow control mechanism for CXL enables the memory device to employ "backpressure" against a host device if one or more buffers of the memory device are full and therefore cannot receive any more requests on the forward path (or any more responses on the return path). In some example systems, there can be three types of credits on an initiator device or a target device to control the flow of traffic between them. These three credit types can be represented by ReqCrd, DataCrd, and RspCrd. More specifically, these three examples are a request credit (ReqCrd), a data credit (DataCrd), and a response credit (RspCrd).

This document now describes example traffic classifications. For communications from the initiator to the target (e.g., from a host device to a memory device), two traffic classifications are:
  REQ: Request without Data—generally Read Requests. These can be controlled using ReqCrd.
  RwD: Request with Data—generally Write Requests. These can be controlled using DataCrd.
For communications from the target to the initiator (e.g., from the memory device to the host device), two traffic classifications are:
  DRS: Response with Data—generally Read Responses. These can be controlled using DataCrd.
  NDR: Response without Data—generally Write Acknowledgements.
  These can be controlled using RspCrd.

These example CXL terms can be applied to the general system of FIG. 4. At a host device, which can be represented by the initiator 302, the credit logic 126 decrements the ReqCrd value (e.g., a quantity for the one or more credits 412) responsive to forwarding a FLIT (e.g., a flit with one read request) across the interconnect 106 to the target 304. If the ReqCrd value reaches zero, the credit logic 126 causes the arbiter 404 to cease sending read FLITs (e.g., the credit logic 126 blocks transmission of further read requests). At a memory device, which can be represented by the target 304, the link controller 314 processes the received FLIT. The arbiter 454 forwards a request 316 that was included in the FLIT to backend memory as a read or write memory request 354 (e.g., a read request for a ReqCrd example). The credit logic 124 increments the ReqCrd value (e.g., the quantity of the collection of credits 414 that are to be returned) responsive to the forwarding of the memory request 354.

The link controller 314 return the request credits (ReqCrd) accumulated at the credit logic 124 to the credit logic 126 with at least one response 318. This credit return 420 may be associated with a decrement of the ReqCrd at the credit logic 124 and an increment of the ReqCrd at the credit logic 126. In some locations of this document, "credits" and credit-related communications may be described with reference to a CXL standard. Nonetheless, implementations of response-based interconnect control, as described in this document, can apply to and benefit other credit-based systems that operate in a similar or analogous manner. The credit-based flow control mechanism 320 is described with reference to FIG. 4 in terms of ReqCrds by way of example only. The principles are applicable to other credit types, which are described further with reference to FIG. 5.

Figure 5:
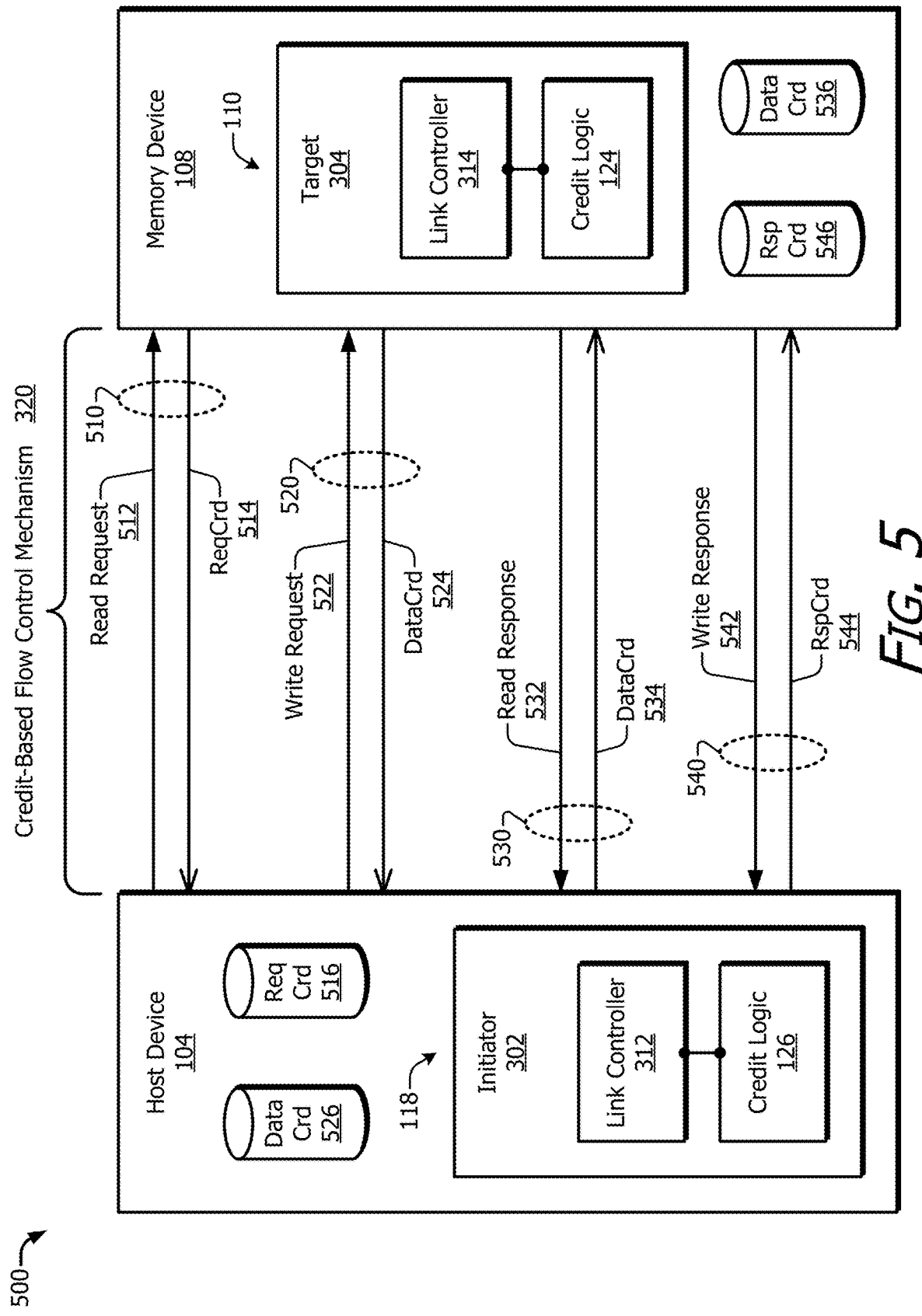
FIG. 5 illustrates examples of credit-based feedback loops to control communication flows between two or more devices in an environment in which aspects of response-based interconnect control can be implemented.

FIG. 5 illustrates, at 500 generally, examples of credit-based feedback loops to control communication flows between two or more devices in an environment in which aspects of response-based interconnect control can be implemented. In example implementations, the two or more devices can include a host device 104 and a memory device 108. The two or more devices may comport with at least one CXL standard that includes memory requests and memory responses. Four example credit-based feedback loops 510, 520, 530, and 540 are shown. Each credit-based feedback loop includes an active or affirmative communication, such as a memory request or a memory response, and an associated credit return. The affirmative communication can include a read or write request or a read or write response. The credit return can correspond to a request credit (ReqCrd), a response credit (RspCrd), or a data credit (DataCrd).

In a first example, the credit-based feedback loop 510 includes a read request 512 and a request credit 514. In operation, the host device 104 transmits the read request 512 to the memory device 108. In response to the link controller 314 forwarding the read request 512 to one or more downstream components of the memory device 108, the credit logic 124 can return the request credit 514 to the initiator 302. Responsive to return of the request credit 514, the credit logic 126 adds another request credit to the request credit repository or count 516. While the request credit count 516 is greater than zero (or the request credit repository 516 is nonempty), the credit logic 126 can permit the link controller 312 to transmit another read request 512. In this manner, the link controller 314 of the target 304 can provide feedback or backpressure to the link controller 312 of the initiator 302 to control (e.g., block, slow, increase/decrease, or otherwise modulate) a flow of the read requests 512.

In a second example, the credit-based feedback loop 520 includes a write request 522 and a data credit 524. In operation, the host device 104 transmits the write request 522 to the memory device 108. In response to the link controller 314 forwarding the write request 522 to one or more downstream components of the memory device 108, the credit logic 124 can return the data credit 524 to the initiator 302. Responsive to return of the data credit 524, the credit logic 126 adds another data credit to the data credit repository or count 526. While the data credit count 526 is greater than zero (or the data credit repository 526 is nonempty), the credit logic 126 can permit the link controller 312 to transmit another write request 522. In this manner, the link controller 314 of the target 304 can provide feedback or backpressure to the link controller 312 to control (e.g., block, slow, increase/decrease, or otherwise modulate) a flow of the write requests 522.

The first and second examples above relate to the target 304 controlling a communication flow (e.g., of memory requests) from the initiator 302. The credit-based feedback loops can, however, operate in the opposite direction. The third and fourth examples below relate to the initiator 302 controlling a communication flow (e.g., of memory responses) from the target 304.

In a third example, the credit-based feedback loop 530 includes a read response 532 and a data credit 534. In operation, the memory device 108 transmits the read response 532 to the host device 104. In response to the link controller 312 forwarding the read response 532 to one or more upstream components of the host device 104 (e.g., to a processor 114 of FIG. 3), the credit logic 126 returns the data credit 534 to the credit logic 124. Responsive to return of the data credit 534, the credit logic 124 adds another data credit to the data credit repository or count 536. While the data credit count 536 is greater than zero, the credit logic 124 can permit the link controller 314 to transmit another read response 532. In this manner, the link controller 312 of the initiator 302 can provide feedback or backpressure to the link controller 314 of the target 304 to control (e.g., block, slow, increase/decrease, or otherwise modulate) a flow of the read responses 532.

In a fourth example, the credit-based feedback loop 540 includes a write response 542 and a response credit 544. In operation, the memory device 108 transmits the write response 542 to the host device 104. In response to the link controller 312 forwarding the write response 542 to one or more upstream components of the host device 104 (e.g., to a processor 114 of FIG. 3), the credit logic 126 returns the response credit 544 to the credit logic 124. Responsive to return of the response credit 544, the credit logic 124 adds another response credit to the response credit repository or count 546. While the response credit count 546 is greater than zero, the credit logic 124 can permit the link controller 314 to transmit another write response 542. In this manner, the link controller 312 of the initiator 302 can provide feedback or backpressure to the link controller 314 of the target 304 to control (e.g., block, slow, increase/decrease, or otherwise modulate) a flow of the write responses 542.

The credit-based feedback loops described above enable an initiator 302 or a target 304 to control a quantity or rate of received memory responses or memory requests, respectively. For the memory device 108, this control may relate to ensuring that a queue at the target 304 (e.g., the request queue 452 or the response queue 456) does not overflow. If the decision to return a credit to the initiator 302 is based solely on a memory request being forwarded out of the request queue 452, memory requests and/or responses may become too prevalent in backend components, such as an interconnect 306, a memory controller 308, or a DRAM 310 (e.g., each of FIG. 3). Likewise, if the decision to return a credit to the initiator 302 is based solely on a memory response being forwarded out of the response queue 456, memory requests and/or responses may become too prevalent in backend components, such as the interconnect 306, the memory controller 308, or the DRAM 310 (e.g., each of FIG. 3). For the host device 104, this control may relate to ensuring that a queue at the initiator 302 (e.g., the response queue 406) does not overflow. If the decision to return a credit to the target 304 is based solely on a memory response being forwarded out of the response queue 406, memory responses may become too prevalent in upstream components, such as the processor 114, a memory controller thereof, or an interconnect of the host device.

To at least alleviate the potential overcrowding of communications (e.g., requests and/or responses) in queues besides those that are identified above in the controller 110, such as overcrowding in the backend components of the memory device 108, the techniques described herein can be implemented. Certain ones of these techniques monitor memory responses that are present at the memory device. For example, a counter can include a value indicative of a quantity of memory responses that are currently stored in the response queue 456 of the memory device. The transmission of credit returns (or the return of credits) can be delayed based on the monitoring and/or the value of the counter to at least slow the transmission of additional memory requests to the memory device 108. By preventing the buffers in the memory device 108 from becoming overcrowded, the techniques can decrease the pin latency of the memory device 108. Example implementations for response-based interconnect control are described below with reference to FIGS. 6-11.

Figure 6:
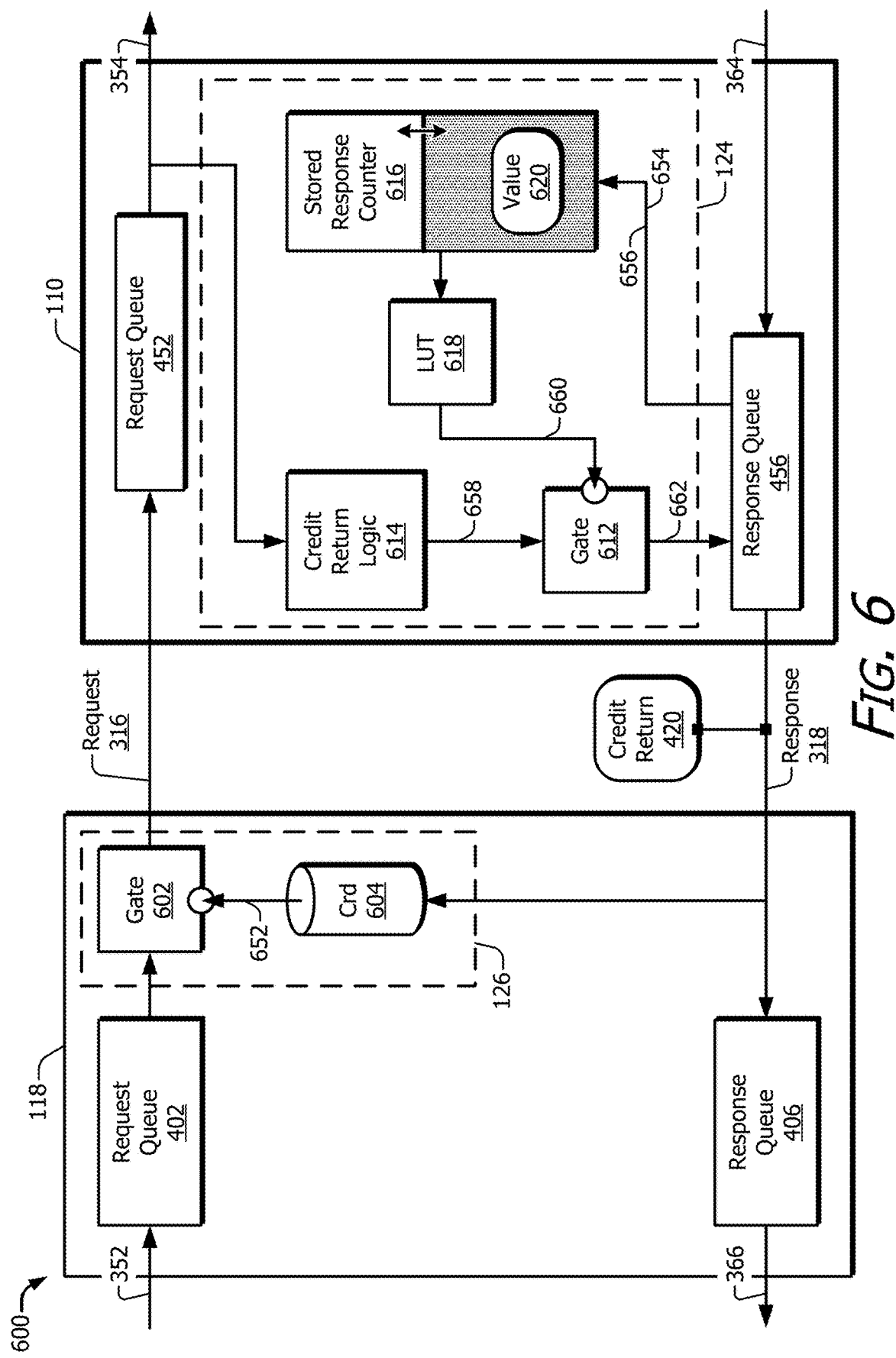
FIG. 6 illustrates example architectures to control a communication flow between two or more devices in accordance with certain implementations for response-based interconnect control.

FIG. 6 illustrates example architectures 600 to control a communication flow between two or more devices in accordance with certain implementations for response-based interconnect control. As shown on the left (as depicted in FIG. 6), a controller 118 includes at least one request queue 402, at least one response queue 406, and at least one instance of credit logic 126. The credit logic 126 can include at least one gate 602 and at least one credit repository or credit counter 604. As shown on the right, a controller 110 includes at least one request queue 452, at least one response queue 456, and at least one instance of credit logic 124. The credit logic 124 can include at least one gate 612, at least one instance of credit return logic 614, at least one stored response counter 616, and at least one lookup table 618 (LUT 618).

In example implementations, the controller 118 at an initiator 302 (e.g., of FIGS. 3-5) can transmit a request 316 from the request queue 402 based on a state of the gate 602. If the gate 602 is open (e.g., if a corresponding switch is closed), the controller 118 can transmit a request 316 to the controller 110. On the other hand, if the gate 602 is closed (e.g., if a corresponding switch is opened), the credit logic 126 can block or prevent the controller 118 from transmitting a request 316. The credit logic 126 can control the state of the gate 602 based on the condition or value of the credit repository or credit counter 604.

If the credit repository 604 is empty or if the credit counter 604 has a value that is less than one, the credit logic 126 closes the gate 602 using a control signal 652 to prevent transmission of requests. In contrast, if the credit repository 604 has at least one credit or if the credit counter 604 has a value greater than zero, the credit logic 126 opens the gate 602 (including keeps the gate 602 open) using the control signal 652 to permit or allow the transmission of requests 316. As described above with reference to FIG. 4, responsive to receipt of a credit return 420, a credit is added to the credit repository 604, or the value of the credit counter 604 is incremented. If multiple credits are returned in a single response 318, the credit logic 126 may add multiple credits "jointly" to the credit repository 604, or the credit logic 126 may increment the value of the credit counter 604 by an amount greater than one.

At a target 304 (e.g., of FIGS. 3-5), the controller 110 adds a received request 316 to the request queue 452. To process a memory request, the controller 110 transmits a request 316 to a downstream or backend memory component as a memory request 354. The credit logic 124 notifies the credit return logic 614 of this transmission. The credit return logic 614 can include a counter (e.g., a second counter (not shown) of the credit logic 124) that has a value indicative of a quantity of one or more credit returns that are ready or available to be transmitted to the controller 118. Responsive to the controller 110 removing another request 316 from the request queue 452, the credit return logic 614 can allocate another credit to be returned as a credit return 420. To do so, the credit return logic 614 can increment the second counter.

By establishing an appropriate quantity of credits for the system, which may be based on a size of the request queue 452, this aspect of a credit-based flow control protocol can ensure that a maximum capacity of the request queue 452 is not exceeded. This aspect may not, however, adequately protect the memory device from oversubscribing backend memory components or the response queue 456. For example, the "internal" interconnect 306 (of FIG. 3) may become too busy, one or more queues of the memory controllers 308-1 and 308-2 may become overfilled, and/or the multiple DRAMs 310-1 and 310-2 may be unable to fulfill the memory requests as fast as the requests are delivered to the memory arrays.

To protect the backend memory components of the memory device 108 and/or the response queue 456 from becoming oversaturated, the credit logic 124 can operate the illustrated components to manage how quickly and/or how frequently credits are returned at 420 to the controller 118. The credit logic 124 can condition the transmission of credit returns 420 at least partially on a fill level of the response queue 456. For example, the credit logic 124 can transmit credit returns 420 at a rate that is dependent on how many memory requests are currently stored in the response queue 456.

To reduce the likelihood that a component, such as the interconnect 106 (e.g., of FIGS. 1-4) or a downstream memory controller of the memory device 108, is rendered idle unnecessarily while still managing the pin latency of the memory device 108, the credit logic 124 can flexibly condition the return of credits on a quantity of memory responses that are present in the response queue 456. In some cases, the credit logic 124 can use the stored response counter 616 and the lookup table 618. The stored response counter 616 can track a quantity of memory responses that are buffered in the response queue 456. The credit logic 124 can condition the issuance of credit returns 420 on the quantity tracked by the stored response counter 616 using the lookup table 618 as described below. Although not shown in FIG. 6, the response queue 456 may be split into a read path and a write path. Thus, the response queue 456 may include at least one read response queue and at least one write response queue, and the principles described herein may be applied separately to read responses and write responses (and the corresponding read requests and write requests and the associated credits).

In some implementations, the credit logic 124 permits a credit return 420 to be sent to the controller 118 in conjunction with every "Nth" memory response transmission. The value of "N" can be an integer that is based on the stored response counter 616 and mappings provided in the lookup table 618. In example operations, the credit logic 124 increments a value 620 stored or maintained by the stored response counter 616 at 654 responsive to the receipt of each memory request 364 and the corresponding addition of the memory request 364 to the response queue 456. The credit logic 124 decrements the value 620 stored or tracked by the stored response counter 616 at 656 responsive to transmission of a response 318 and a corresponding removal of the memory response from the response queue 456. Accordingly, the value 620 can track how many memory requests are stored in the response queue 456.

Meanwhile, the credit return logic 614 can enable a credit to be returned at 658 responsive to the memory request 354 being issued from the request queue 452 and/or responsive to a stored supply of credits that are available to be returned. However, the gate 612 can block the delivery of the credit return 420. A state of the gate 612 may be open or closed, and the state can be established by a control signal 660. If the gate 612 is open (e.g., a corresponding switch is closed), the credit logic 124 can permit at least one credit return 420 to pass for transmission to the controller 118 (e.g., with a memory response). On the other hand, if the gate 612 is closed (e.g., a corresponding switch is opened), the credit logic 124 can block or prevent the controller 110 from transmitting a credit return 420.

The state of the gate 612 can be controlled responsive to the value 620 of the stored response counter 616 using the lookup table 618. As described above, the value 620 can be increased at 654 responsive to receipt of a memory request 364 at the response queue 456. To enable the value 620 to represent a quantity of memory requests present at the response queue 456, the credit logic 124 can decrease (e.g., decrement) the value 620 of the counter 616 at 656 responsive to transmission of a memory response 318 and a removal of the memory response from the response queue 456. Thus, the value 620 of the stored response counter 616 can track the quantity of memory requests that are stored within the response queue 456. As the value 620 increases, this can indicate, for example, that the backend memory components are producing responses too quickly and/or that the interconnect 106 (e.g., of FIGS. 3 and 4) cannot accept the memory responses sufficiently fast. In either case, the associated increasing congestion within the memory device 108 can appreciably reduce memory responsiveness, including by increasing latency.

To reduce or prevent at least some of these potential avenues of congestion, the credit logic 124 can modulate the arrival of additional requests 316 from the controller 118 by controlling (e.g., delaying or slowing) how credit returns 420 are transmitted to the controller 118. To do so, the credit logic 124 can close the gate 612 to block the credit return logic 614 from providing a credit return. In some implementations, the credit logic 124 controls a state of the gate 612 responsive to the value 620 of the stored response counter 616 and based on the lookup table 618. The credit logic 124 can access the lookup table 618 based on the value 620, which is indicative of a quantity of memory responses stored in the response queue 456. The lookup table 618 maps ranges of quantities to rates of transmission for credit returns.

Thus, the credit logic 124 can obtain a rate of transmission for the credit returns from the lookup table 618 based on the value 620 of the counter 616. The rate can be related to a ratio of memory responses transmitted with a credit return to memory responses transmitted, such as combined memory responses transmitted. The combined memory responses transmitted can include memory responses transmitted with a credit return and memory responses transmitted without a credit return. This ratio can change over time based on changes to the value 620. By way of example only, the ratio can be adjusted over time across one more settings, such as 1-to-1, 1-to-2, 1-to-3, 1-to-4, 1-to-5, 1-to-8, and so forth.

The lookup table 618 can include multiple entries. Each entry can map a range of quantities (e.g., of the value 620) of multiple ranges of quantities to a number of memory responses to be transmitted for each credit return to be transmitted. For example, a value 620 of "X" memory responses stored in the response queue 456 can be part of a range of quantities that maps to "Y" memory responses being transmitted for each credit return 420 that is being transmitted. For instance, a value 620 of "23" may index to a range of "20-32" that maps to "4" memory responses per credit return. In this instance, the controller 110 transmits a credit return 420 each four transmissions of a memory response. In other words, each "4th" transmission of a memory response may include or be accompanied by a credit return 420. In such instances, there are three memory response transmissions without a credit return between any two consecutive memory response transmissions that include a credit return 420. Example implementations of a lookup table 618 are described below with reference to FIG. 7.

The rate may be adjusted over time as the value 620 changes. Generally, the credit logic 124 can decrease the rate of the transmitting of the credit returns 420 responsive to increases of the quantity of the multiple memory responses stored in the response queue 456. Conversely, the credit logic 124 can increase the rate of the transmitting of the credit returns 420 responsive to decreases of the quantity of the multiple memory responses stored in the response queue 456. By changing the rate at which credit returns 420 are transmitted back to the controller 118, the controller 110 can slow the rate of newly arriving memory requests 316. This can smooth request and response traffic within the memory device 108 and therefore decrease latency.

The credit logic 124 can use a number obtained from the lookup table 618 as a basis to provide a control signal 660 to the gate 612 to establish a closed state or an open state thereof. For example, if an "Nth" memory response is to be transmitted, the credit logic 124 can open the gate 612 to permit a credit return 420 to flow from the credit return logic 614 at 662 to the credit logic 126 of the controller 118 with that "Nth" memory response. If, however, a memory response within a cycle or interval is not the "Nth" memory response, the credit logic 124 can close the gate 612 to prevent credit returns 420 from flowing from the credit return logic 614 to the credit logic 126. Over some time period, as memory responses 364 are received more slowly from the backend memory components (or the interconnect 106 becomes more available), the value 620 decreases due to the decrement signal 656. Responsive to the value 620, which is indicative of the quantity of memory responses within the response queue 456, falling into another range of quantities, the credit logic 124 can open the gate 612 more frequently or even keep the gate 612 open.

Using these techniques, the credit logic 124 can modulate how quickly or how frequently requests 316 are received from the controller 118 based on how "busy" the backend memory components of the memory device 108 are and/or how quickly such backend memory components are providing new memory responses 364. These techniques can enable the memory device 108 to avoid becoming overwhelmed and/or oversubscribed and, therefore, enable the memory device 108 to provide some specified quality of service. Additional example approaches to implementing the credit logic 124, including a lookup table 618, are described next with reference to FIG. 7.

Figure 7:
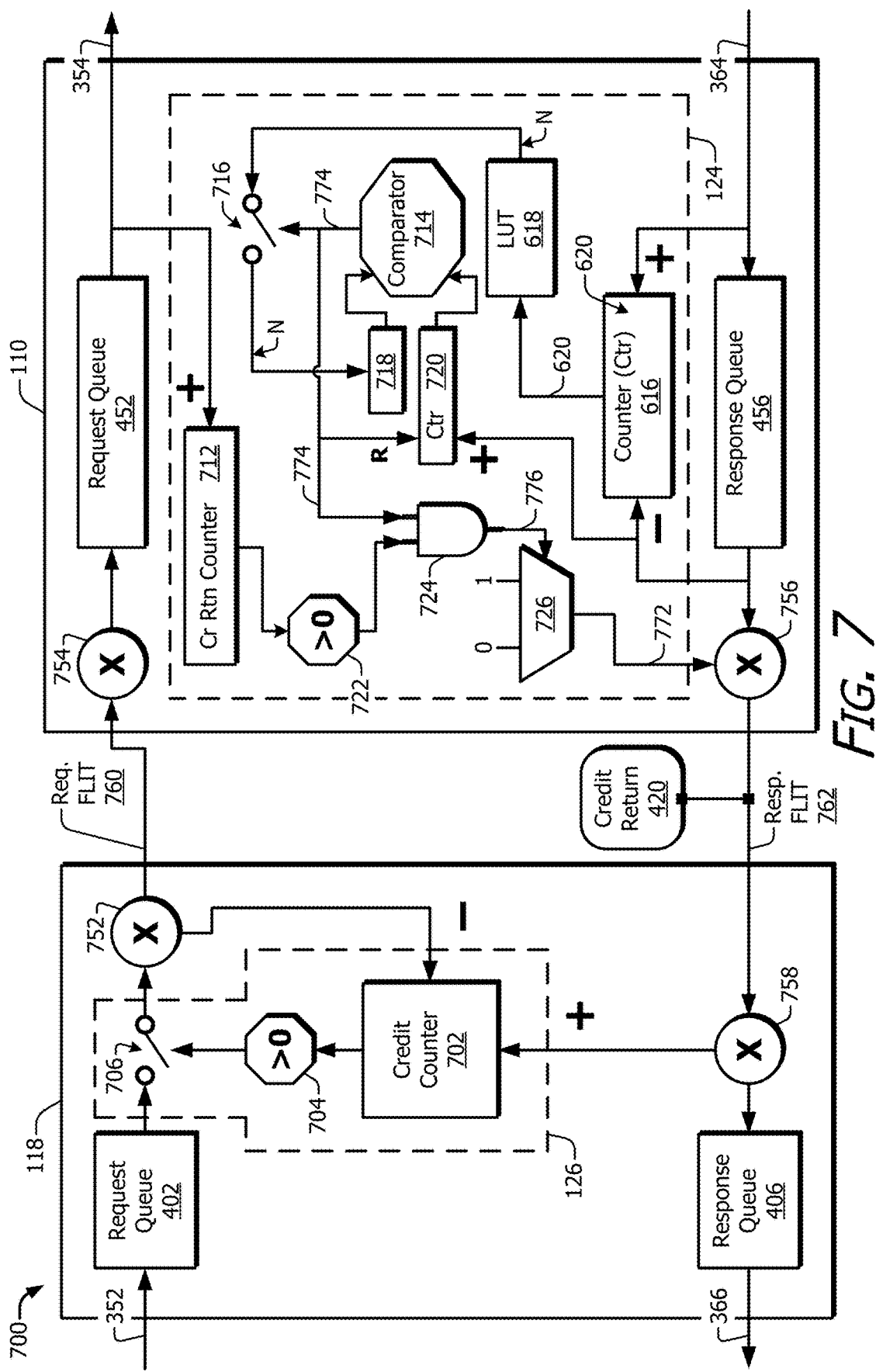
FIG. 7 illustrates other example architectures to control a communication flow between two or more devices in accordance with certain implementations for response-based interconnect control.

FIG. 7 illustrates other example architectures 700 to control a communication flow between two or more devices in accordance with certain implementations for response-based interconnect control. As illustrated, the architectures 700 include multiple flit handlers 752, 754, 756, and 758 that process FLITs, such as by creating or interpreting a FLIT. At the controller 118, the credit logic 126 can include at least one credit counter 702, at least one comparator 704, and at least one switch 706. At the controller 110, the credit logic 124 can include the counter 616 (e.g., the stored response counter 616), at least one credit return counter 712, at least one comparator 714, at least one switch 716, at least one register 718, at least one counter 720 (or other counter 720), at least one comparator 722, at least one AND gate 724, and at least one multiplexer 726.

Each of these components can be coupled one to another at least as shown in FIG. 7. For instance, the register 718 and the counter 720 may be coupled to inputs of the comparator 714, which can have an output thereof be coupled to a control input of the switch 716. The switch 716 can be coupled between the lookup table 618 and the register 718. The output of the comparator 714 may also be coupled to a reset input of the counter 720 and an input of the AND gate 724. An output of the AND gate 724 can be coupled to a control input of the multiplexer 726. The multiplexer 726 can be provided a "0" or a "1" input and can provide an output to an input of the flit handler 756.

In example implementations, the flit handlers 752 and 756 produce FLITs, and the flit handlers 754 and 758 interpret or unpack FLITs (e.g., a FLow control unIT (FLIT)). Thus, the flit handler 752 of the controller 118 can transmit a request FLIT 760, and the flit handler 754 of the controller 110 can receive the request FLIT 760. Analogously, the flit handler 756 of the controller 110 can transmit a response FLIT 762, and the flit handler 758 of the controller 118 can receive the response FLIT 762. Responsive to receipt of a response FLIT 762, the flit handler 758 can forward a response to the response queue 406 and provide one or more credit returns 420 to the credit counter 702 of the credit logic 126.

The credit logic 126 can maintain a count of available credits (e.g., request credits 516 or data credits 526 of FIG. 5) using the credit counter 702. The comparator 704 can compare a current count from the credit counter 702 to a set value, such as zero. If the count is greater than zero, the credit logic 126 can close the switch 706 to permit requests to flow. If the count is not greater than zero, the credit logic 126 can open the switch 706 to block requests from flowing. If requests are flowing, the flit handler 752 can prepare a request FLIT 760 and indicate to the credit logic 126 that the count of the credit counter 702 is to be decremented responsive to transmission of the request FLIT 760. Accordingly, while the controller 118 possesses at least one credit, the flit handler 752 can transmit a request FLIT 760 to the flit handler 754 of the controller 110.

The flit handler 754 can unpack the request FLIT 760 and forward at least one memory request to the request queue 452. The request queue 452, or associated logic, can notify the credit logic 124 that the count of the credit return counter 712 is to be incremented in conjunction with the request queue 452 removing a memory request and forwarding it to a backend memory component as a memory request 354. Thus, responsive to a request being forwarded from the request queue 452, the credit logic 124 increments a count of the credit return counter 712. The comparator 722 compares a count of the credit return counter 712 to a value, such as zero (0). If the count is less than or equal to zero, the comparator 722 can output a "0." If the count is greater than zero, the comparator 722 can output a "1." These comparison outputs are coupled to an input (e.g. a first input) of the AND gate 724.

Another input (e.g., a second input) of the AND gate 724 receives a signal 774 from response-related control circuitry, which is described below. An output of the AND gate 724 is coupled to a control input of the multiplexer 726. If the output of the AND gate 724 is high, then the multiplexer 726 produces a signal 772. The multiplexer 726 forwards an affirmative signal 772 to the flit handler 756. The affirmative signal 772 instructs the flit handler 756 to include a credit return 420 in the next response FLIT 762 with one or more memory responses from the response queue 456. On the other hand, if the output of the AND gate 724 is low, then the multiplexer 726 forwards a negative signal 772 to the flit handler 756. The negative signal 772 instructs the flit handler 756 to omit or omit including a credit return 420 in the next response FLIT 762 carrying one or more memory responses from the response queue 456. The output of the AND gate 724 depends also on the second input, which receives the signal 774 from the comparator 714. The comparator 714 operates as described next.

In example operations at the controller 110, the credit logic 124 tracks a quantity of memory responses present at the response queue 456 using the counter 616, which has the value 620. The credit logic 124 increments the counter 616 (e.g., increases the value 620 by at least one) responsive to a memory request 364 being added to the response queue 456. The credit logic 124 decrements the counter 616 (e.g., decreases the value 620 by at least one) responsive to a memory request being removed from the response queue 456, including responsive to the memory request being transmitted to the controller 118 as part of at least one response FLIT 762.

The credit logic 124 applies the value 620 to the lookup table (LUT) 618. The credit logic 124 obtains a number of memory requests to include in each interval based on the value 620 stored by the counter 616. As explained further below, for each interval of some number (e.g., "N," which can be an integer) of memory request transmissions, the credit logic 124 authorizes one credit return 420 for transmission. By adjusting the number "N" of memory requests per interval, the rate of transmission of credit returns 420 can be changed. The adjustment can be based on the quantity of memory responses in the response queue 456 using the value 620 and the lookup table 618.

The lookup table 618 includes multiple entries. Each entry corresponds to a range of quantities of memory requests currently stored in the response queue 456. Each entry maps the range to a corresponding number "N" of memory requests per interval. An example of a lookup table 618 is presented below in Table 1.

TABLE 1

Example of Lookup Table (LUT)
Mapping Queue Depth to Interval Size

| Depth (Filled or Occupied Quantity) (X) of a Response Queue | Size of Interval (Y) in Terms of Number of Memory Responses Transmitted |
| --- | --- |
| Range #1 [<A] | 1 |
| Range #2 [A-B] | 2 |
| Range #3 [B-C] | 3 |
| Range #4 [C-D] | 4 |
| Range #5 [>D] | 8 |

The variables A, B, C, and D can represent constants for different quantities of memory requests that may be present in the response queue 456. Generally, A<B<C<D. Each range corresponds to a quantity of slots ("X") in the response queue 456 that are filled or occupied. These variables can be tuned based on the components of the memory device to achieve particular bandwidth or latency targets. The variables of the LUT 618 can be hardwired, set (e.g., programmed or fused) during manufacturing or testing, changeable in the field or during assembly of a part, or adjustable in real time during operation of a device. A lookup table 618 can have more or fewer than the five entries with the five ranges as indicated above.

Each entry maps a range of quantities to a size ("Y") of an interval of a number of memory requests that are transmitted during or for each interval. The indicated sizes are provided by way of example only; for other sizes for each interval may be used. A lookup table 618 can additionally or alternatively include an entry (e.g., a range of quantities) that causes no credit returns to be transmitted until the value 620 is lowered to another entry of the table. Further a lookup table 618 may additionally or alternatively include an entry having a range that corresponds to unrestrained credit returns such that multiple credit returns can be transmitted with a single memory response, as potentially impacted by other credit-related control loops.

Continuing with FIG. 7, the credit logic 124 obtains a number ("N") of memory responses (Y) for each interval based on the value 620 (X) using the lookup table 618. The lookup table 618 outputs the number "N" and provides the number "N" to one side of the switch 716. Consider a state of the circuitry in which the comparator 714 closes the switch 716 using the signal 774. The number "N" is provided to the register 718 and is loaded therein. The register 718 establishes the number of memory requests to be transmitted in each interval for a given interval.

The comparator 714 also provides the signal 774 to the counter 720 and the other input (e.g., the second input) of the AND gate 724. The signal 774 resets the counter 720—e.g., to zero (0). The counter 720 holds a number representing how many memory responses have been transmitted in a current interval, which can start with zero (0). With regard to the AND gate 724, if the comparator 722 is providing a positive/high signal to the first input, the AND gate 724 outputs a high signal at 776 to cause the multiplexer 726 to authorize another credit return transmission with the signal 772.

With the counter 720 being reset, a new interval is started that is to have "N" additional memory response transmissions. Each time a memory response is removed from the response queue 456, in addition to decrementing the counter 616, the credit logic 124 increments the counter 720, which tracks how many memory responses have been transmitted during the current interval. Meanwhile, the comparator 714 is comparing the number of memory responses that have been transmitted from the counter 720 to the number "N" of memory responses that are to be transmitted as held by the register 718. After one or more increments of the counter 720, the two numbers eventually become equal, and the comparator 714 detects this equivalency.

Thus, the comparator 714 determines that the number of memory responses that have been transmitted for a current interval has reached the number set for this interval as stored in the register 718. The comparator 714 therefore drives the signal 774 to activate the switch 716, reset the counter 720, and indicate to the AND gate 724 that the interval is being concluded. Accordingly, the AND gate 724, the multiplexer 726, and the flit handler 756 can authorize transmission of a credit return 420 for the current interval. The credit logic 124 can also update the number "N" stored in the register 718 using the lookup table 618 based on the current value 620 of the counter 616 responsive to the switch 716 being closed.

By modulating (e.g., slowing, limiting, or moderating) the rate at which credits at the host device get replenished, described techniques can throttle the host's ability to send traffic to the memory device. This throttling can reduce queuing latency on the memory device response buffer or the memory device request buffer, including both of these buffers and/or backend buffers. This modulation can be accomplished based on how full the response queue is by, for example, adjusting a number "N" of memory requests that are transmitted each interval that is associated with a single credit return transmission. The number "N" can be obtained from a table with multiple ranges of quantities corresponding to an occupied depth of the response queue. The ranges of quantities and the values for the number "N"

may be adjusted to account for slower backend memory subsystems or faster backend memory subsystems and/or a crowded or uncrowded interconnect 106. The credit logic 124 may also adjust these ranges and values during operation based on a measured latency or bandwidth/throughput.

Figure 8:
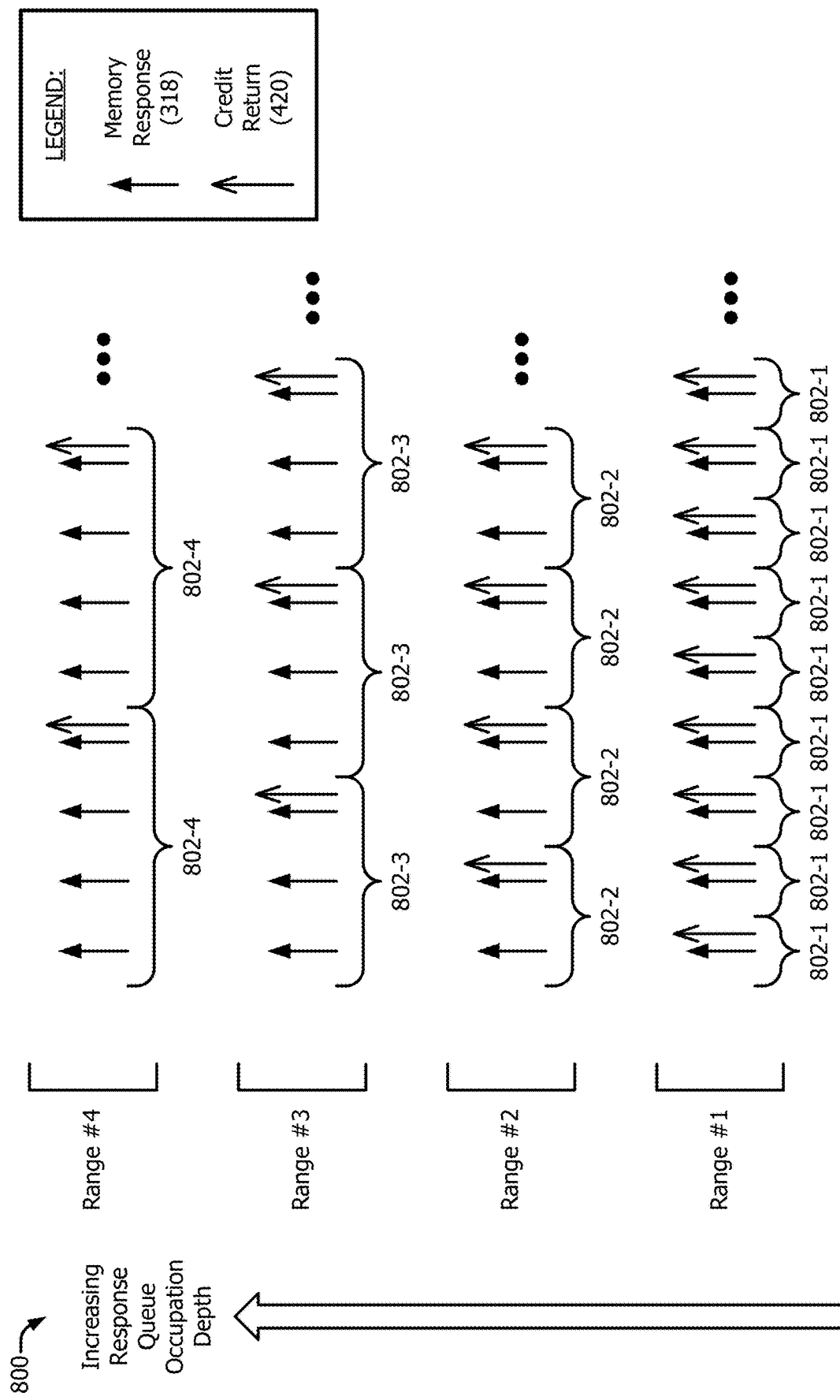
FIG. 8 illustrates multiple example intervals corresponding to multiple response queue occupation depths in accordance with response-based interconnect control.

FIG. 8 illustrates, generally at 800, multiple example intervals 802 corresponding to multiple response queue occupation depths in accordance with aspects of response-based interconnect control. The example intervals are described here with reference to Table 1, which is presented above in the description of FIG. 7 as an example of a lookup table 618. Table 1 includes multiple entries, with each entry associated in the first column with a range of quantities of memory responses that are present in the response queue 456. In the second column of Table 1, each range of quantities corresponds to, and can be mapped to, a number "N" of memory responses 318 to be transmitted each interval. Once each interval, the memory device also transmits a credit return 420, which can be transmitted with a memory response 318.

As indicated in the legend of FIG. 8, each memory response 318 is represented by a shorter arrow with a closed point, and each credit return 420 is represented by a taller arrow with an open point. FIG. 8 includes example ranges #1, #2, #3, and #4. These ranges are presented in an order of increasing response queue occupation depth from the bottom of the page to the top of the page. In other words, range #1 corresponds to a response queue that has the fewest memory responses stored in it (e.g., the lowest response queue occupation depth) as compared to the other example depicted ranges.

Range #1 corresponds to a first interval 802-1 having one memory request per interval 802-1. Range #2 corresponds to a second interval 802-2 having two memory requests per interval 802-2. Range #3 corresponds to a third interval 802-3 having three memory requests per interval 802-3. Range #4 corresponds to a fourth interval 802-4 having four memory requests per interval 802-4. In each of these first, second, third, and fourth intervals 802-1, 802-2, 802-3, and 802-4, the memory device transmits a single credit return 420 per interval 802. In the illustrated examples, each range corresponds to multiple regular intervals. As used herein, a regular interval can relate to intervals that have a same size or length—such as a common number of memory responses 318.

As shown, the rate of transmission of credit returns decreases as the values of the range of quantities increases. Thus, the rate of credit return transmission is lower for the range #3 as compared to the range #2. By establishing the number "N" of memory response transmissions that occur per interval 802 and/or per one credit return transmission, the controller 110 can change the rate at which credits are replenished at the controller 118 to control how many requests are sent from the controller 118 over the interconnect 106 to the controller 110 over time.

In FIG. 8, the transmissions of memory responses are shown individually and equally-spaced apart. However, this depiction is for clarity and understanding only. First, multiple memory responses can be transmitted together. Second, a series of consecutive memory response transmission may not occur at regular temporal intervals. Further, it should be noted that the intervals 802 can be defined in terms of a number "N" of memory responses and that the intervals 802 may not, therefore, correspond to equal lengths of time. Moreover, the ranges may correspond to different values of the number "N," and other ranges may be included with more memory responses per interval 802. Additionally, more, fewer, and/or different ranges (e.g., with wider or narrower value ranges) may be implemented. At other times of operation, the interval-based control may be paused such that other control loops may dominate the determination of how many or when credit returns 420 are transmitted.

The credits for the example architectures 600 and 700 can correspond at least to any of the credits described above, such as request credits, data credits, or response credits. The requests 316 may correspond, for instance, to read requests or write requests in a memory context. The responses 318 may correspond, for instance, to read responses or write responses in a memory context. Nonetheless, the principles described with reference to FIGS. 6-8, as well as the other figures, are applicable to other types of credits, communications, and/or environments. Also, although certain concepts are described herein in the context of CXL Type 3 devices ("Memory Expanders"), the described techniques can be applied to other CXL device types and/or to non-CXL devices.

Further, the described principles are applicable to environments generally having credit-based communications. For example, a transmitter or initiator component may transmit requests besides memory requests. Similarly, a receiver or target component may receive "general" requests instead of or in addition to memory requests. Accordingly, the credit logic 124 may monitor the presence of pending responses at the target for non-memory responses, such as a computational response (e.g., for a cryptographic, AI accelerator, or graphics computation), a communications response (e.g., for transmitting or receiving a packet over some interface or network), and so forth. The described techniques can ensure that other types of targets—besides memory devices—do not become oversubscribed if the corresponding requests or responses are pending "too long" in the backend of the other target types while a response queue at a controller is emptying too slowly.

Example Methods

Figure 9:
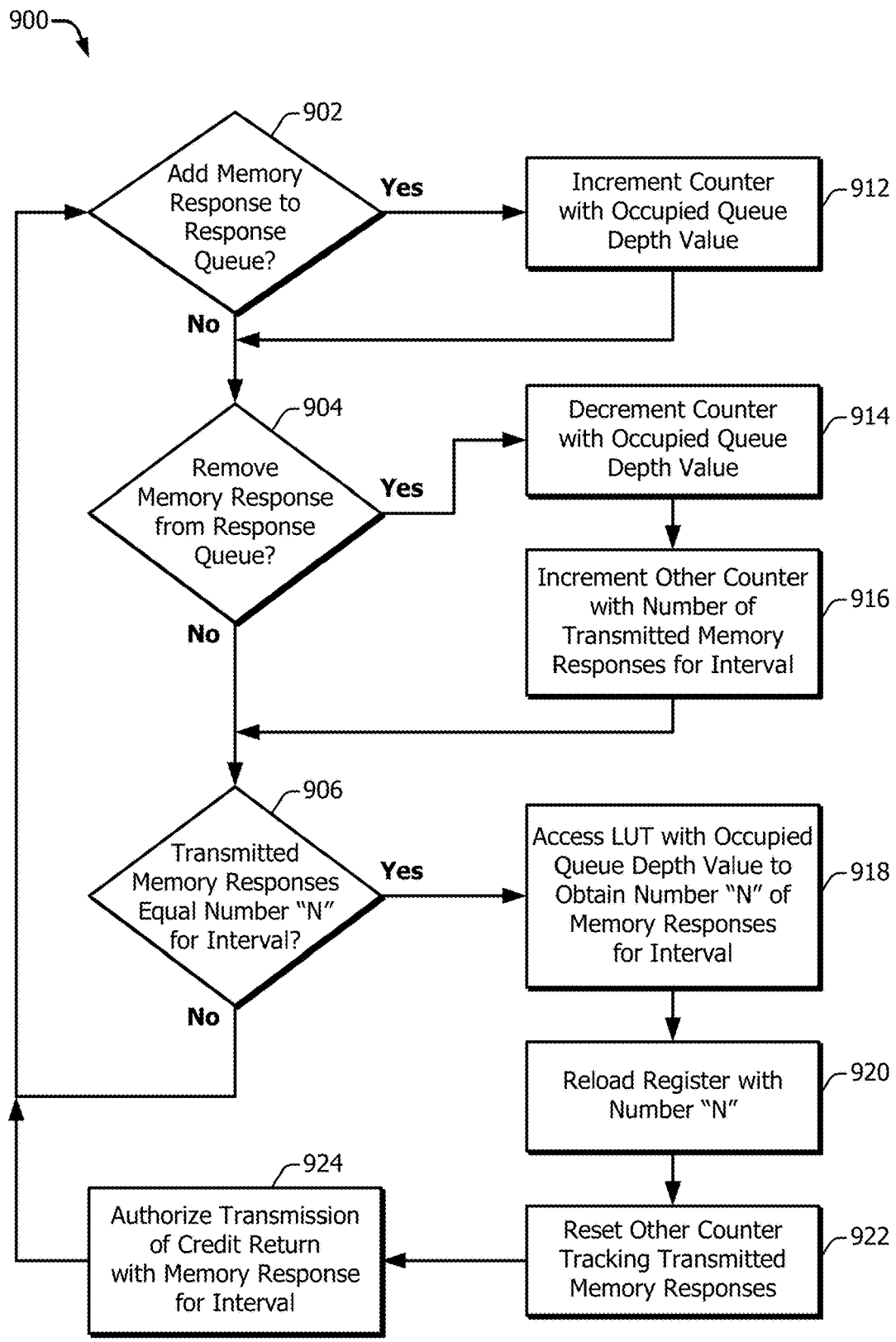
FIG. 9 illustrates a flow chart for example processes that implement aspects of response-based interconnect control.
Figure 10:
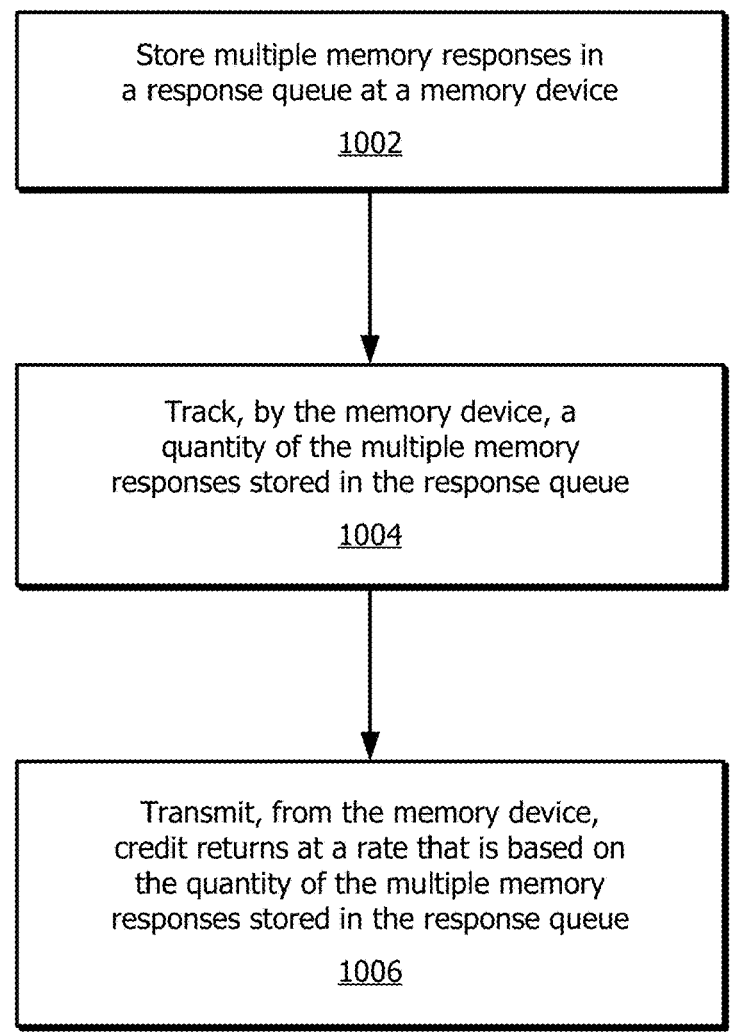
FIG. 10 illustrates a flow diagram for example processes that implement aspects of response-based interconnect control.
Figure 11:
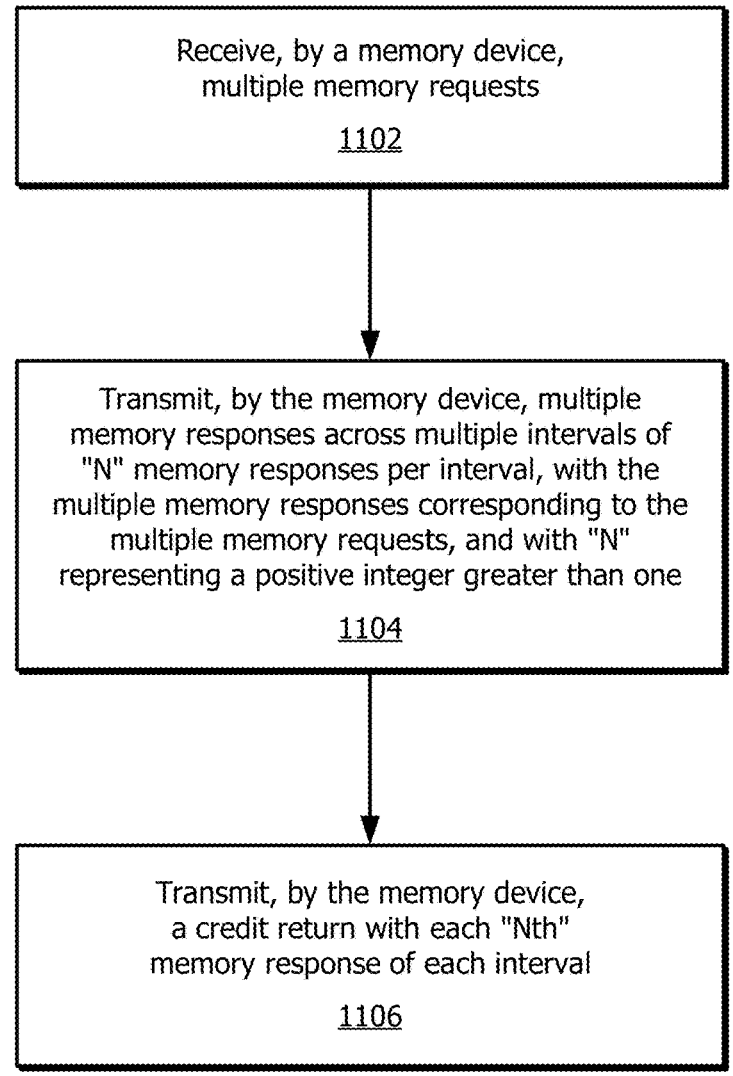
FIG. 11 illustrates a flow diagram for other example processes that implement aspects of response-based interconnect control.

This section describes example methods with reference to the flow chart(s) and flow diagram(s) of FIGS. 9-11 for implementing aspects of response-based interconnect control. These descriptions may also refer to components, entities, and other aspects depicted in FIGS. 1-8, which reference is made only by way of example.

FIG. 9 illustrates a flow chart for example processes 900 that can implement aspects of response-based interconnect control. The processes 900 can include blocks 902 to 906 (e.g., for one or more branching decisions) and blocks 912 to 924. The process 900 may be performed by, for instance, a target device that is in communication with an initiator device. In a memory environment, for example, the target device may be realized with a memory device, and an initiator device may be realized with a host device. The target device can additionally or alternatively be realized with a communication device (e.g., a modem), an accelerator device (e.g., for AI operations), a graphics device (e.g., a graphics card), and so forth. The initiator can be any device or component that is requesting a service or operation from the target.

At block 902, a controller determines if a memory response has been added to a response queue. If so, at block 912 the controller increments a counter representing an occupied queue depth of the response queue with a value. After the incrementing at block 912 or responsive to a determination at block 902 that no memory response has been added, the process 900 continues with block 904.

At block 904, the controller determines if a memory response has been removed from the response queue. If so, then at block 914 the controller decrements the value of the counter representing the occupied queue depth of the response queue. At block 916, the controller also increments another counter that tracks a number of transmitted memory responses in a current interval. After the incrementing at block 916 or responsive to a determination at block 904 that no memory response has been removed, the process 900 continues with block 906.

At block 906, the controller determines if the number of responses transmitted during the current interval (e.g., as maintained in the other counter) is equal to a number "N" of response transmissions per interval (e.g., as read from a register). If the two numbers are not equal, the process 900 continues with block 902. The process 900 can continue while the response queue is being monitored and credit returns are being throttled based on an occupied depth of the response queue.

If, on the other hand, the controller determines at block 906 that the number of responses transmitted during the current interval is equal to the number "N" of response transmissions that are established per interval or for the current interval, the process 900 continues at block 918. At block 918, the controller accesses a lookup table (LUT) using the occupied queue depth value (e.g., as tracked in the counter) to obtain a next number "N" of memory responses to transmit for the next interval. At block 920, the controller loads or reloads the register with the next number "N" of memory response transmissions for the next interval as obtained from the LUT based on the occupied queue depth.

At block 922, the controller resets the other counter (e.g., to a zero value) to track anew the number of memory response transmissions in the next interval. At block 924, the controller authorizes transmission of a credit return with a memory response for the next interval. Alternatively, the controller can authorize the credit return transmission with a memory response for the "current" interval. In other words, the credit return can be transmitted (e.g., with a memory response) at the start of an interval, at the end of the interval, or otherwise during a given interval. The acts shown in FIG. 9 may be performed in other orders and/or in partially or fully overlapping manners or in conjunction with any of the acts of FIG. 10 or 11. The hardware described herein may implement the acts of FIG. 9.

FIG. 10 illustrates a flow diagram for example processes 1000 that implement aspects of response-based interconnect control. The example processes 1000 include blocks 1002 to 1006. At block 1002, a memory device stores multiple memory responses in a response queue. For example, a controller 110 can store multiple memory responses in a response queue 456 at a memory device 108. For instance, the response queue 456 may receive multiple memory responses 364 from a backend component of the memory device 108 and add such memory responses 364 to the response queue 456.

At block 1004, the memory device tracks a quantity of the multiple memory responses stored in the response queue. For example, the controller 110 can track a quantity of the multiple memory responses that are stored in the response queue 456. To do so, credit logic 124 of the controller 110 may increment a value 620 of a counter 616 responsive to additions of memory responses to the response queue 456 or may decrement the value 620 of the counter 616 responsive to removals of memory responses from the response queue 456.

At block 1006, the memory device transmits credit returns at a rate that is based on the quantity of the multiple memory responses stored in the response queue. For example, the controller 110 can transmit credit returns 420 at a rate that is based on the quantity of the multiple memory responses that are stored in the response queue 456. In some cases, the credit logic 124 may increase the rate of the transmission of the credit returns 420 responsive to decreases in the quantity (e.g., as reflected by the value 620) of the multiple memory responses stored in the response queue 456 and may decrease the rate of the transmission of the credit returns 420 responsive to increases in the quantity (e.g., as reflected by the value 620) of the multiple memory responses stored in the response queue 456. The credit logic 124 may adjust the transmission rate of credit returns by adjusting a ratio of memory response transmissions with a credit return to total memory response transmissions (e.g., combined transmissions of memory response transmissions with a credit return and memory response transmissions without a credit return).

FIG. 11 illustrates a flow diagram for other example processes 1100 that implement aspects of response-based interconnect control. The example processes 1100 include blocks 1102 to 1106. At block 1102, the memory device receives multiple memory requests. For example, a memory device 108 can receive multiple memory requests 316. For instance, a controller 110 of the memory device 108 may receive the multiple memory requests 316 from another device (e.g. a host device 104) via an interconnect 106.

At block 1104, the memory device transmits multiple memory responses across multiple intervals of "N" memory responses per interval, with the multiple memory responses corresponding to the multiple memory requests, and with "N" representing a positive integer greater than one. For example, the memory device 108 can transmit multiple memory responses 318 across multiple intervals 802 of "N" memory responses per interval 802. The multiple memory responses 318 can correspond to the multiple memory requests 316 (e.g., a response may complete or indicate completion of a requested operation), and the variable "N" can represent a positive integer greater than one. In some cases, the controller 110 may logically separate transmissions of the multiple memory responses 318 into multiple intervals 802. Each interval 802 may include two (2), three (3), four (4), seven (7), sixteen (16), etc. memory responses 318.

At block 1106, the memory device transmits a credit return with each "Nth" memory response of each interval. For example, the memory device 108 can transmit a credit return 420 with each "Nth" memory response 318 of each interval 802. To do so, the controller 110 may monitor how many memory responses 318 have been transmitted in a given interval 802 and may transmit a single credit return over the interconnect 106 in the given interval 802. The transmission of the credit return 420 may occur at any point during the interval and may accompany at least one memory response 318 of the current interval 802. Credit logic 124 of the controller 110 may adjust the variable "N" over time to change the rate of credit return transmissions, including based on a fullness level of a response queue 456.

For the flow chart(s) and flow diagram(s) described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, software, or some combination thereof. The methods may be realized using one or more of the apparatuses, components, or other aspects shown in FIGS. 1 to 8, the components or aspects of which may be further divided, combined, rearranged, and so on. The devices and components of these figures generally represent hardware, such as electronic devices, packaged modules, IC chips, or circuits; firmware or the actions thereof; software; or a combination thereof. Thus, these figures illustrate some of the many possible systems or apparatuses capable of implementing the described methods.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although implementations for response-based interconnect control have been described in language specific to certain features and/or methods, the subject of the appended claims is not necessarily limited to the specific features or methods described. Rather, the specific features and methods are disclosed as example implementations for response-based interconnect control.

What is claimed is:

1. A method comprising:
storing multiple memory responses in a response queue at a memory device;
tracking, by the memory device, a quantity of the multiple memory responses stored in the response queue; and
transmitting, from the memory device, credit returns at a rate that is based on the quantity of the multiple memory responses stored in the response queue.

2. The method of claim 1, wherein the rate is related to a ratio of memory responses transmitted with a credit return to memory responses transmitted.

3. The method of claim 2, further comprising:
adjusting the rate based on the quantity of the multiple memory responses stored in the response queue.

4. The method of claim 3, further comprising:
decreasing the rate of the transmitting of the credit returns responsive to increases of the quantity of the multiple memory responses stored in the response queue.

5. The method of claim 3, further comprising:
increasing the rate of the transmitting of the credit returns responsive to decreases of the quantity of the multiple memory responses stored in the response queue.

6. The method of claim 2, wherein:
the rate is related to a ratio of (i) memory responses transmitted with a credit return to (ii) memory responses transmitted with a credit return and without a credit return; and
the ratio comprises each of the following over time: 1-to-1, 1-to-2, 1-to-3, and 1-to-4.

7. The method of claim 1, further comprising:
accessing a lookup table based on the quantity of the multiple memory responses stored in the response queue; and
obtaining the rate from the lookup table based on the accessing.

8. The method of claim 7, further comprising:
indexing into a range of quantities of multiple ranges of quantities of the lookup table based on the quantity of the multiple memory responses stored in the response queue,
wherein the rate comprises a number of memory responses to be transmitted for each credit return to be transmitted.

9. The method of claim 1, further comprising:
tracking a quantity of credits that are available to be returned; and
transmitting the credit returns based on the quantity of the credits that are available to be returned.

10. The method of claim 9, further comprising:
removing multiple memory requests from a request queue at the memory device;
tracking, by the memory device, the quantity of the credits that are available to be returned based on the removing; and
transmitting, from the memory device to a host device, the credit returns based on the quantity of the credits that are available to be returned.

11. The method of claim 1, further comprising:
returning request credits to authorize an initiator to send read requests.

12. The method of claim 1, further comprising:
returning data credits to authorize an initiator to send write requests.

13. The method of claim 1, further comprising:
transmitting the credit returns at multiple regular intervals based on the quantity of the multiple memory responses stored in the response queue, each regular interval of the multiple regular intervals corresponding to a quantity of memory responses of multiple quantities of memory responses transmitted from the memory device.

14. The method of claim 13, wherein:
each quantity of memory responses of the multiple quantities of memory responses transmitted from the memory device to establish each respective regular interval of the multiple regular intervals comprises an integer selected from a range extending between one (1) and three (3).

15. The method of claim 13, further comprising:
adjusting the quantity of memory responses transmitted from the memory device that establishes the regular interval based on changes in the quantity of the multiple memory responses stored in the response queue.

16. The method of claim 1, further comprising:
adding a memory response to the response queue responsive to receiving the memory response from a backend component of the memory device; and
removing the memory response from the response queue in conjunction with transmitting the memory response to another device.

17. An apparatus comprising:
a response queue configured to store multiple memory responses;
a counter configured to track a value indicative of a quantity of the multiple memory responses that are stored in the response queue; and
credit logic configured to condition transmission of credit returns on the value indicative of the quantity of the multiple memory responses that are stored in the response queue.

18. The apparatus of claim 17, wherein:
the credit logic is configured to transmit credit returns at a rate that is based on the value of the counter; and
the rate comprises a number of memory responses to be transmitted for each credit return to be transmitted.

19. The apparatus of claim 18, wherein:
the number of memory responses to be transmitted for each credit return to be transmitted comprises an integer selected from a range extending between two (2) and four (4).

20. The apparatus of claim 17, further comprising:
a lookup table including multiple entries, each entry of the multiple entries mapping a range of quantities of multiple ranges of quantities to a number of memory responses to be transmitted for each credit return to be transmitted,
wherein the credit logic is configured to access the lookup table based on the value indicative of the quantity of the multiple memory responses that are stored in the response queue.

21. The apparatus of claim 20, further comprising:
a register configured to hold a number of memory responses to currently be transmitted for each credit return to be transmitted,
wherein the credit logic is configured to load the register with the number of memory responses to currently be transmitted for each credit return to be transmitted responsive to the access of the lookup table.

22. The apparatus of claim 21, further comprising:
a second counter configured to track a number indicative of how many memory responses have been transmitted in a current interval,
wherein the credit logic is configured to increment the second counter responsive to transmission from the response queue of a memory response of the multiple memory responses.

23. The apparatus of claim 22, further comprising:
a comparator coupled to the register and the second counter, the comparator configured to compare the number from the register to the number from the second counter,
wherein the credit logic is configured to permit transmission of a credit return responsive to the number from the register being equal to the number from the second counter.

24. The apparatus of claim 23, wherein the credit logic is configured to:
block transmission of the credit return responsive the number from the register not being equal to the number from the second counter.

25. The apparatus of claim 23, wherein the credit logic is configured to, responsive to the number from the register being equal to the number from the second counter:
reset the second counter that is configured to track the number indicative of how many memory responses have been transmitted in a current interval; and
load into the register from the lookup table the number of memory responses to currently be transmitted for each credit return to be transmitted.

26. The apparatus of claim 17, further comprising:
a second counter configured to track a quantity of credit returns that are available to be transmitted,
wherein the credit logic is configured to condition the transmission of the credit returns on the quantity of credit returns that are available to be transmitted.

27. The apparatus of claim 26, further comprising:
a comparator coupled to the second counter and configured to compare the quantity of credit returns that are available to be transmitted to zero (0),
wherein the credit logic is configured to permit the transmission of at least one credit return based on the quantity of credit returns that are available to be transmitted being greater than zero (0).

28. The apparatus of claim 17, wherein the credit logic is configured to:
include a credit return of the credit returns each "Nth" memory response transmission of multiple memory response transmissions, with "N" based on the value indicative of the quantity of the multiple memory responses that are stored in the response queue; and
omit a credit return with each memory response transmission of the multiple memory response transmissions between consecutive "Nth" memory response transmissions.

29. The apparatus of claim 17, wherein the response queue is configured to receive the multiple memory responses from one or more backend memory components.

30. The apparatus of claim 29, further comprising:
the one or more backend memory components.

31. The apparatus of claim 30, wherein the one or more backend memory components comprise at least one of:
a memory controller; or
a memory array.

32. The apparatus of claim 31, wherein the memory array comprises at least one of:
a dynamic random-access memory (DRAM) array; or
a nonvolatile memory array.

33. The apparatus of claim 17, wherein the apparatus comprises a memory-coherent memory device.

34. The apparatus of claim 33, wherein the memory-coherent memory device comprises a Type 3 memory device in accordance with at least version 2.0 of a Compute Express Link™ (CXL) standard.

35. A method comprising:
receiving, by a memory device, multiple memory requests;
transmitting, by the memory device, multiple memory responses across multiple intervals of "N" memory responses per interval, the multiple memory responses corresponding to the multiple memory requests, with "N" representing a positive integer greater than one; and
transmitting, by the memory device, a credit return with each "Nth" memory response of each interval.

36. The method of claim 35, further comprising:
omitting a credit return with memory responses of each interval except for the "Nth" memory response.

37. The method of claim 35, further comprising:
determining a value for the "N" based on a quantity of memory responses that are present in a response queue of the memory device.

38. The method of claim 37, further comprising:
adjusting a size of each interval by changing the value for the "N" based on the quantity of memory responses that are present in the response queue of the memory device.

39. The method of claim 35, further comprising:
increasing a number of memory responses included in each interval of the multiple intervals responsive to an increase in a quantity of memory responses that are present in a response queue of the memory device; and
decreasing the number of memory responses included in each interval of the multiple intervals responsive to a decrease in the quantity of memory responses that are present in the response queue of the memory device.

40. The method of claim 35, further comprising:
transmitting, from the memory device to a host device, a credit return and at least one memory response that are incorporated into at least one flit.

41. An apparatus comprising:
a response queue configured to store multiple memory responses;
a counter configured to have a value; and
credit logic coupled to the response queue and configured to:
increment the value responsive to a memory response being added to the response queue;
decrement the value responsive to a memory response being removed from the response queue;
transmit a credit return once each interval of multiple intervals, each interval corresponding to multiple memory responses that number "N;" and
adjust the number "N" responsive to the value of the counter.

42. The apparatus of claim 41, further comprising:
a controller including the response queue, the counter, and the credit logic; and
at least one memory component coupled to the controller, wherein the response queue is configured to receive the multiple memory responses from the at least one memory component.

43. The apparatus of claim 42, wherein the controller is configured to:
transmit the credit return to a host device over an interconnect in accordance with a memory-coherent interface.

44. The apparatus of claim 41, further comprising:
a lookup table configured to map the value of the counter to the number "N," which represents a number of memory responses to be transmitted in each interval and the number of memory responses to be transmitted for each credit return that is transmitted.

45. The apparatus of claim 44, wherein the credit logic is configured to:
index to an entry of the lookup table based on the value of the counter, the entry associated with a range of values that includes the value of the counter; and
read from the lookup table the number "N" that corresponds to the range of values of the indexed entry.

* * * * *